United States Patent
Kadono et al.

(10) Patent No.: US 6,438,254 B1
(45) Date of Patent: Aug. 20, 2002

(54) MOTION VECTOR DETECTION METHOD, MOTION VECTOR DETECTION APPARATUS, AND DATA STORAGE MEDIA

(75) Inventors: Shinya Kadono, Hyogo; Jun Takahashi, Osaka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/531,150

(22) Filed: Mar. 17, 2000

(30) Foreign Application Priority Data

Mar. 17, 1999 (JP) .......................................... 11-072283

(51) Int. Cl.[7] .............................................. G06T 11/00
(52) U.S. Cl. ........................ 382/107; 348/699; 345/473
(58) Field of Search ................................ 345/473, 419; 348/699; 382/107, 190

(56) References Cited

U.S. PATENT DOCUMENTS

| | | | | |
|---|---|---|---|---|
| 5,581,308 A | * | 12/1996 | Lee ............................. | 348/699 |
| 5,699,128 A | * | 12/1997 | Hayashi ....................... | 348/669 |
| 5,930,379 A | * | 7/1999 | Rehg et al. .................. | 382/107 |
| 6,108,005 A | * | 8/2000 | Starks et al. ................. | 345/419 |
| 6,285,379 B1 | * | 9/2001 | Gallery ........................ | 345/473 |
| 6,335,985 B1 | * | 1/2002 | Sambonsugi et al. ....... | 382/190 |

OTHER PUBLICATIONS

Ram Srinivasan et al., "Predictive Coding Based on Efficient Motion Estimation", IEEE Transactions on Communications, vol. Com-33, No. 8, Aug. 1985, pp. 888–897.

* cited by examiner

Primary Examiner—Mark Zimmerman
Assistant Examiner—Huedung X. Cao
(74) Attorney, Agent, or Firm—Wenderoth, Lind & Ponack, L.L.P.

(57) ABSTRACT

The present invention provides a motion vector detection apparatus for performing a hierarchy motion vector detection process, in which an unnecessary second hierarchy motion detection process is cut down and times of error calculation required in the second hierarchy motion detection process are reduced, whereby a motion vector is detected at a high speed and with high precision. This motion vector detection apparatus comprises a comparison decision unit u5a for referring to a motion compensation error corresponding to a detected motion vector of a neighboring block, thereby deciding a case where the coding efficiency is not improved even when the second hierarchy motion detection is performed.

13 Claims, 14 Drawing Sheets

MOTION VECTOR DETECTION METHOD, MOTION VECTOR DETECTION APPARATUS, AND DATA STORAGE MEDIA

FIELD OF THE INVENTION

The present invention relates to a motion vector detection method, a motion vector detection apparatus, and a data storage medium. More particularly, this invention relates to a block unit motion compensation coding process, i.e., a motion vector detection process of generating a motion vector at a high speed and with high precision, which motion vector is used in a process of efficiently coding an image signal for each block comprising a prescribed number of pixels, using a pixel value correlation between frames.

BACKGROUND OF THE INVENTION

In recent years, we have greeted the age of multimedia in which audio, video and other data are integrally handled, and the conventional information media, i.e., means for transmitting information to men, such as newspapers, magazines, televisions, radios, and telephones, have been adopted as the targets of multimedia. Generally, "multimedia" means media in which, not only characters, but also diagrams, speeches, and especially images are simultaneously expressed in relation with each other. In order to handle the conventional information media as the targets of multimedia, it is necessary to express the information into digital formats.

When the quantity of data possessed by each of the above-described information media is estimated as the quantity of digital data, in the case of characters, the data quantity for each character is 1~2 byte. However, in the case of speech, the data quantity is 64 kbits per second (quality for telecommunication). Further, in the case of moving picture, the required data quantity is more than 100 Mbits per second (quality for current television broadcasting). So, in the above-described information media, it is not practical to handle such massive data as it is in the digital format. For example, although visual telephones have already been put to practical use by ISDN (Integrated Services Digital Network) having a transmission rate of 64 kbps~1.5 Mbps, it is impossible to transmit an image of a television camera as it is by the ISDN.

So, data compression technologies are demanded. For example, for visual telephones, the moving picture compression techniques based on the H.261 and H.263 standard which have been standardized by ITU-T (International Telecommunication Union-Telecommunication Sector) are employed. Further, according to the data compression technique based on MPEG1 standard, it is possible to record image data as well as audio data in an ordinary music CD (compact disk).

The MPEG (Moving Picture Experts Group) is an international standard of data compression for moving pictures, and the MPEG1 is the standard for compressing moving picture data to 1.5 Mbps, i.e., data of a television signal to about 1/100. Since the transmission rate of the targets to which MPEG1 standard is directed is limited to about 1.5 Mbps, in the MPEG2 which has been standardized to meet the demand for higher image quality, moving picture data is compressed to 2~15 Mbps.

Furthermore, under the existing circumstances, standardization of MPEG4 is now proceeded by the working group for standardization of MPEG1 and MPEG2 (ISO/IEC JTC1/SC29/WG11), and this MPEG4 enables coding and signal processing in object units, and thereby realizes new functions required in the age of multimedia. The MPEG4 has originally aimed at standardization of coding methods of low bit rates, but the target of standardization is now extended to more versatile coding methods of high bit rates which are adaptable to an interlaced image.

In the above-mentioned coding process, a process of coding an image signal using the pixel value correlation between frames, i.e., so-called inter-frame motion compensation coding is utilized, thereby realizing a substantial data compression (bit rate saving). In this inter-frame motion compensation coding, an image signal of a block to be processed as a coding target (hereinafter referred to also as a target block) is compared with an image signal corresponding to a frame which was subjected to the coding (image signal of a reference frame), in units of image spaces each comprising 16×16 pixels (macroblocks) or image spaces each comprising 8×8 pixels (blocks). Then, positional information indicating a position of a region (prediction block) on the reference frame in which region an arrangement pattern of pixel values is most similar to that in the target block is detected as a motion vector corresponding to the target block. This motion vector is coded together with a differential signal (motion compensation error) between an image signal corresponding to the target block and an image signal corresponding to the prediction block (reference block).

FIG. 11 is a block diagram illustrating a prior art typical inter-frame motion compensation coding apparatus. To simplify the description, the macroblock comprising 16×16 pixels and the block comprising 8×8 pixels are both referred to as a block, hereinafter. This inter-frame motion compensation coding apparatus (hereinafter abbreviated as coding apparatus) 1000 receives an image signal which is obtained by dividing an image signal corresponding to a prescribed object so that the divided image signal corresponds to the block, successively block by block. Then, the coding apparatus 1000 subjects the image signal for each block to the inter-frame motion compensation coding.

To be specific, the coding apparatus 1000 comprises a subtracter d1 for obtaining a difference Dt between an image signal St corresponding to a block to be processed as a coding target and an image signal (motion compensation data) Pt corresponding to a prediction block obtained from an image signal corresponding to a reference frame, an orthogonal transformer d2 for transforming the difference Dt obtained by the subtracter d1 into a frequency component Tt by the orthogonal transformation such as DCT (Discrete Cosine Transformation), a quantizer d3 for quantizing the frequency component Tt and outputting a quantized value Qt, and a variable length encoder d4 for coding the quantized value Qt and outputting coded data Et.

In addition, the coding apparatus 1000 comprises an inverse quantizer d5 for inverse quantizing the quantized value Qt to obtain a frequency component IQt, an inverse orthogonal transformer d6 for transforming the obtained frequency component IQt into image data (pixel value) ITt in the spatial region by a processing such as inverse DCT, an adder d7 for adding the obtained image data ITt and the motion compensation data Pt, and a frame memory d8 for temporarily containing an output Rt of the adder d7 as data to be referred to in the coding of a subsequent frame.

Further, the coding apparatus 1000 comprises a motion detector d9 for comparing the image signal St corresponding to the block to be processed with image data Ct of the reference frame stored in the frame memory d8, for each region on the reference frame, each region being the same size as the block to be processed, and deriving information (motion vector) MV for indicating the position of a region (prediction block) on the reference frame, which has the minimum difference between the image signal St and the image data Ct, and a motion compensator d10 for generating an address signal Ad for the frame memory d8 according to the detected motion vector MV, obtaining image data Mt of a region (prediction block) which is specified by a pixel position on the reference frame, on the basis of the address signal Ad, and outputting this image data as the motion compensation data Pt.

In the above-mentioned prior art coding apparatus 1000, in stead of directly coding the image signal St, an output of the low-energy subtracter d1 is coded, thereby increasing the compression efficiency. It is known that this compression efficiency is increased, the smaller the energy of the output (amplitude of an output signal) of the subtracter d1 is. Therefore, it is important for the motion detector d9 to detect the motion vector at a high speed and with high precision. When the motion vector is detected with high precision, the energy of the output of the subtracter d1 is reduced.

In FIG. 11, the image signal (image data) St is input to an input terminal i20 and the coded data Et is output from an output terminal o20. In the coding apparatus 1000 shown in FIG. 11, the frame memory d8 and the motion detector d9 constitute a motion vector detection apparatus 200 for detecting the motion vector. Hereinafter, this motion vector detection apparatus 200 will be described in detail.

FIG. 12 is a block diagram illustrating a structure of a prior art typical motion vector detection apparatus.

This motion vector detection apparatus 200 comprises the frame memory d8 for containing the image data Ct of the reference frame, a motion vector generator u1a for receiving information Sc indicating a motion vector search origin from outside, and outputting candidate motion vectors MVc for indicating plural pixel positions in the vicinity of the search origin, an error calculator u3a for calculating an error (motion compensation error) Dp between the pixel value (image data) Ct of the prediction block on the reference frame, which is indicated by the candidate motion vectors MVc, and the image signal (image data) St of the input block to be processed, and a minimum error selector u4a for monitoring the error Dp as output of the error calculator u3a, and selecting a candidate motion vector having the minimum error from the candidate motion vectors MVc as the output of the motion vector generator u1a, thereby to output the selected candidate motion vector as a motion vector MVs corresponding to the block to be processed. In this case, the motion detector d9 is constituted by the motion vector generator u1a, the error calculator u3a, and the minimum error selector u4a.

In FIG. 12, the image signal (image data) St is input to a first input terminal i1 of the motion vector detection apparatus 200. The motion vector search origin information Sc is input to a second input terminal a1 i2 of the motion vector detection apparatus 200. for receiving. The motion vector MVs is output from an output terminal o1 of the detection apparatus 200. The motion vector search origin information Sc indicates a position where the search process for comparing the image signal Ct of the reference frame stored in the frame memory d8 with the input image signal St, thereby to detect the motion vector is started. A position on the reference frame corresponding to the same spatial position as the target block on the frame to be processed or a position on the reference frame indicated by a detected motion vector of a neighboring block in the vicinity of the target block is usually used as the start position of the search process. For example, as the neighboring block in the vicinity of the target block, a block next to the target block on the left is used.

Then, a description of an operation is given.

When the image signal St corresponding to the block to be processed as a coding target is input to the inter-frame motion compensation coding apparatus 1000, the subtracter d1 obtains the difference Dt between the image signal St of the block to be processed and the image signal (motion compensation data) Pt of the corresponding prediction block. This difference Dt is transformed by the orthogonal transformer d2 into the frequency component Tt by the orthogonal transformation process such as DCT (Discrete Cosine Transformation). This frequency component Tt is quantized by the quantizer d3 and the corresponding quantized value Qt is output to the variable length encoder d4. Then, this quantized value Qt is variable length coded by the variable length encoder d4 into a variable length code, and the coded data Et corresponding to the block to be processed is output from the encoder d4.

At this time, the quantized value Qt is inverse quantized by the inverse quantizer d5 into the frequency component IQt by the inverse quantization process. This frequency component IQt is transformed by the inverse orthogonal transformer d6 into the image data (pixel value) ITt in the spatial region. This image data ITt is added by the adder d7 to the motion compensation data (image signal corresponding to the prediction block) Pt, and reproduction data Rt corresponding to the block to be processed is generated. This reproduction data Rt is temporarily stored in the frame memory d8 as reference data which is referred to in the coding of an image signal corresponding to a frame subsequent to the processed frame.

In the motion detector d9, the image signal Ct corresponding to the reference frame, which is stored in the frame memory d8 is compared with the image signal St corresponding to the block to be processed. The positional information of a prescribed region (prediction block) of the same size as the block to be processed on the reference frame is derived from the motion detector d9 as the motion vector MV corresponding to the block to be processed. Then, in the motion compensator d10, the address Ad corresponding to the position on the reference frame indicated by this motion vector MV is generated. On the basis of this address Ad, the image data Mt corresponding to the prediction block is output from the frame memory d8 as the motion compensation data Pt corresponding to the block to be processed.

Next, an operation of the motion vector detection apparatus 200 comprising the motion detector d9 and the frame memory d8 will be described in more detail.

The motion vector generator u1a in the motion vector detection apparatus 200 outputs motion vectors for indicating plural pixel positions in the vicinity of the search origin as the candidate motion vectors MVc, on the basis of the vector search origin information Sc which is supplied from out side the apparatus. Then, the frame memory d8 outputs an image signal (motion compensation data) Ct corresponding to a block on the reference frame, which is indicated by the candidate motion vectors MVc. Then, the error calculator u3a calculates the differential signal (image error data) Dp between the motion compensation data Ct corresponding to each of the candidate motion vectors and the image signal of the target block. The minimum error selector u4a monitors this image error data Dp, and selects a candidate motion vector MVc having the minimum error data Dp from the plural candidate motion vectors MVc, thereby outputting the selected candidate motion vector as the motion vector (selected motion vector) MVs corresponding to the block to be processed.

This motion vector detection apparatus 200 has a simple structure. However, it has a problem that the operation amount in calculating the motion compensation error is increased in proportion to the range of search for the motion vector, i.e., the number of the candidate motion vectors generated by the motion vector generator u1a.

In other words, for an image including an object having a large motion, the motion vector search in a wide range on the image space leads to the improvement in coding efficiency. Therefore, in order to increase the coding efficiency, it is important to reduce the error calculation having the maximum operation load among operation processings in the motion detection apparatus.

Accordingly, a hierarchical motion vector detection method is often used as a method for reducing the number of operation times for the error calculation in the motion vector detection apparatus.

FIG. 13 is a diagram for explaining a prior art motion vector detection method (three-step method) as an example of the hierarchical motion vector detection method.

In this three-step method, in the n-th hierarchy processing, the search is recurrently performed at eight neighboring positions around a search origin, i.e., an indication position indicated by a motion vector detected in the (n−1)-th hierarchy processing, in a search range one-third the size of the search range of the (n−1)-th hierarchy processing. Here, the eight neighboring positions are four neighboring positions which are in the upward, downward, leftward, and rightward directions of the indication position and four neighboring positions which are in the upper rightward, lower rightward, upper leftward, and lower leftward directions of the indication position.

In FIG. 13, a mark ○ denotes a pixel as a constituent of a reference frame. The mark ○ in which the number "1" is written denotes a pixel as a search target in the first hierarchy processing (first search target pixel), and this is a typical position of candidate prediction blocks (motion compensation blocks) indicated by the candidate motion vectors. Nine of the first search target pixels are shown on the reference frame in FIG. 13, including the pixel as the search origin.

Initially, in the first hierarchy motion detection process, with a pixel P0 as the search origin, image error data corresponding to a specified block which is specified by positions of the pixel P0 and its surrounding pixels P1a to P1h (i.e., an error of image data between the specified block and the block to be processed) is detected. In this case, the surrounding pixel P1b has the minimum image error data. Therefore, the second hierarchy motion detection process is performed with this pixel P1b as the search origin. The surrounding pixels P1a to P1h are positioned at intervals of 9 pixels from the pixel P0 as the search origin on lines parallel to the vertical direction, horizontal direction, and slanting directions with ±45-degree angle to the horizontal direction, all of which include the search origin.

Then, in the second hierarchy motion detection process, with the surrounding pixel P1b as the search origin, image error data corresponding to a specified block which is specified by positions of surrounding pixels P2a to P2h of the pixel P1b (i.e., an error of image data between the specified block and the block to be processed) is detected. In this case, the surrounding pixel P2e has the minimum image error data. Therefore, the third hierarchy motion detection process is performed with the pixel P2e as the search origin. The surrounding pixels P2a to P2h are positioned at intervals of 3 pixels from the pixel P1b as the search origin on lines parallel to the vertical direction, horizontal direction, and slanting directions with ±45-degree angle to the horizontal direction, all of which include the search origin of the second hierarchy motion detection process.

Finally, in the third hierarchy motion detection process, with the surrounding pixel P2e as the search origin, image error data corresponding to a specified block which is specified by positions of surrounding pixels P3a to P3h of the pixel P2e (i.e., an error of image data between the specified block and the block to be processed) is detected. Here, the surrounding pixel P3a has the minimum image error data. Therefore, a motion vector indicating this pixel P3a (diagonally shaded ○) is decided as a motion vector corresponding to the block to be processed, which is detected by the three-step method. Here, the surrounding pixels P3a to P3h are positioned at intervals of one pixel from the pixel P2e as the search origin on lines parallel to the vertical direction, the horizontal direction, and slanting directions with ±45-degree angle to the horizontal direction, all of which include the search origin in the third hierarchy motion detection process.

In this three-step method, under conditions which are usually satisfied for image data, i.e., under conditions that the closer the pixel is to the search position having the minimum image error data, the smaller the image error data corresponding to the pixel becomes, the motion vector can be detected with almost the same precision as that of a method of simply calculating image error data directly for all pixel positions in the search range (all pixels on the reference frame), thereby to detect a motion vector having the minimum image error data.

In the motion detection process according to the three-step method shown in FIG. 13, the calculation times for image error data (hereinafter also referred to simply as an error) are 9 times in the first hierarchy processing, 8 times in the second hierarchy processing, and 8 times in the third hierarchy processing, resulting in 25 times in total. Therefore, it is evident that the number of error calculation times can be substantially reduced with relative to the method of simply calculating the error directly for the all pixel positions in the search range.

FIG. 14 is a diagram for explaining another prior art motion vector detection method.

In this motion vector detection method, a process of searching the position of a pixel having the minimum error (image error data) is performed with ½-pixel precision.

In this ½-pixel precision search process, an interpolation pixel having a virtual pixel value is defined between two adjacent pixels on the reference frame. And a motion vector which indicates a pixel position having the minimum image error data is searched on the reference frame including these interpolation pixels. Then, on the basis of the motion vector with ½-pixel precision, which is obtained by this search process, the motion compensation with high precision of ½ pixel or less is performed. Here, the pixel value of the interpolation pixel is obtained by the interpolation operation for pixel values of pixels on both sides of the interpolation pixel.

This ½-pixel precision search process is utilized to reduce the energy (amplitude level) of the output signal of the subtracter d1 in the coding apparatus shown in FIG. 11, thereby increasing the coding efficiency.

In this ½-pixel precision search process, when a pixel value of the reference frame is read from the frame memory, a new process of generating the virtual pixel value of the interpolation pixel which is positioned between two adjacent pixels by the interpolation operation is required. Accordingly, in the first hierarchy search process, the motion detection process with integer pixel precision is performed for pixels which are indicated by full line marks ○ in FIG. 14. Then, in the second hierarchy search process, with a pixel P'0 (see FIG. 14) detected in the first search process as the search origin, a pixel position having the minimum error is detected with restricting search target pixels to neighborhood pixels which are around and adjacent to the pixel P'0 (pixels P'1 to P'8 in FIG. 14). In this way, the motion vector with ½-pixel precision can be detected.

These prior art hierarchy motion vector search processes have a feature that the search range is narrowed and the search density is increased in stages while the motion vector having the minimum error is always selected within the search range corresponding to each stage.

FIG. 15 is a block diagram illustrating the prior art hierarchy motion vector detection apparatus.

This hierarchy motion vector detection apparatus 201 comprises a first hierarchy motion detector for detecting a motion vector MV1s by the first hierarchy search process on the basis of positional information (hereinafter referred to also as motion vector search origin information) Sc indicating a motion vector search origin, which is input from outside, and a second hierarchy motion detector for detecting a motion vector MV2s by the second hierarchy search process on the basis of the motion vector MV1s obtained by the first hierarchy search process.

In this case, like the motion vector detection apparatus 200 shown in FIG. 12, the first hierarchy motion detector comprises a MV generator u1a for generating plural first candidate motion vectors MV1c on the basis of the motion vector search origin information Sc from outside, a frame memory u2 for containing image data of a reference frame, an error calculator u3a for calculating error data D1p between motion compensation data (image data of a candidate prediction block) C1t read out from the frame memory u2 on the basis of the first candidate motion vectors MV1c and image data St of an input target block, and a minimum error selector u4a for selecting a candidate motion vector having the minimum error data from the plural candidate motion vector MV1c on the basis of the error data D1p, as a first hierarchy motion vector MV1s.

The second hierarchy motion detector comprises a MV generator u1b for generating plural second candidate motion vectors MV2c with a pixel position indicated by the first hierarchy motion vector MV1s as the search origin, a frame memory u2 for containing the image data of the reference frame, an error calculator u3b for calculating error data D2p between motion compensation data (image data of a candidate prediction block) C2t read from the frame memory u2 on the basis of the second candidate motion vectors MV2c and the image data St of the input target block, and a minimum error selector u4b for selecting a candidate motion vector having the minimum error data from the plural candidate motion vectors MV2c on the basis of the error data D2p, as a second hierarchy motion vector MV2s. The minimum error data D1pm is supplied to the error calculator u3b of the second hierarchy motion detector, from the minimum error selector u4a of the first hierarchy motion detector. Accordingly, it is unnecessary for the error calculator u3b to obtain error data corresponding to the search origin in the second hierarchy motion detection process.

In the motion vector detection apparatus 201, the frame memory u2 is commonly used by the first hierarchy motion detector and the second hierarchy motion detector. In FIG. 15, the image signal St of the target block is input to a first input terminal i1. The motion vector search origin information Sc is input to a second input terminal i2. The motion vector MV2s of the target block is output from an output terminal o1. The frame memory u2 shown in FIG. 15 is the same as the frame memory d8 as shown in FIGS. 11 and 12.

Next, a description is given of an operation.

In the first hierarchy motion detector in the motion vector detection apparatus 201 in FIG. 15, exactly the same search process as that in the motion vector detection apparatus 200 in FIG. 12 is performed, whereby a motion vector corresponding to the target block is generated as the first hierarchy motion vector MV1s.

When the first hierarchy motion vector MV1s is input to the second hierarchy motion detector in the motion vector detection apparatus 201, with a pixel position on the reference frame which is indicated by the first hierarchy motion vector MV1s as the search origin, the plural second candidate motion vectors MV2c corresponding to surrounding pixels in the vicinity of the search origin are generated in the second hierarchy motion detector.

When the image data (motion compensation data) C2t read from the frame memory u2, corresponding to the candidate prediction block on the reference frame indicated by the second candidate motion vectors is input to the error calculator u3b, the error data D2p between the motion compensation data C2t and the image data St of the target block is calculated.

In the minimum error selector u4b, the error data D2p corresponding to the respective candidate motion vectors MV2c is input together with the plural candidate motion vectors MV2c generated by the MV generator u1b, and a candidate motion vector MV2c having the minimum error data is selected and output as the second hierarchy motion vector MV2s.

The error data D1pm corresponding to the search origin in the motion vector generator u1b (i.e., motion vector selected by the minimum error selector u4a) is already calculated by the error calculator u3a and notified to the minimum error selector u4a. Therefore, when this minimum error data D1pm is notified from the minimum error selector u4a to the error calculator u3b, an operation for obtaining error data corresponding to the motion vector indicating the search origin in the second hierarchy motion detection process can be omitted in the error calculator u3b.

FIG. 15 shows the motion vector detection apparatus 201 which detects the motion vector corresponding to the target block by the search process in two hierarchies. However, it is easily known by analogy that a structure of a motion vector detection apparatus which detects the motion vector corresponding to the target block by the search process in three hierarchies can be obtained by further adding another set of an error calculator, a minimum error selector, and a MV generator to the motion vector detection apparatus 200 shown in FIG. 12.

In addition, the prior art motion vector detection method is not limited to the method of performing the hierarchical search process as described with reference to FIGS. 13 and 14. There is another method of deciding a search direction for each pixel position with a motion vector search origin as a search starting position, thereby to search a pixel position having a smaller motion compensation error on the reference frame.

FIG. 16 is a diagram for explaining such a motion vector detection method of shifting the search position successively from the vector search origin, to obtain a pixel position having a smaller motion compensation error, and this figure shows an arrangement of pixels on a reference frame. In the figure, Ps0 and Psa~Psi each denotes a pixel on the reference frame.

This motion vector detection method is called "One at a time" method. Hereinafter, a process flow of this motion vector detection method is described in more detail.

Here, assume that following relationships (1) to (3) stand as for the image data error (motion compensation error) SADs0 and SADsa~SADsi between a block on the reference frame which is specified by the respective pixels Ps0 and Psa~Psi shown in FIG. 16 and a block to be processed on a processed frame:

$$SADs0, SADsa > SADsb \quad (1)$$

$$SADsb, SADsd > SADsc \quad (2)$$

$$SADsc, SADsf\text{~}SADsi > SADse \quad (3)$$

In this motion vector detection method, initially in the first step, the search for the pixels Psa and Psb which are on the left and right of the pixel Ps0 as the search origin is performed on the reference frame.

In this case, the motion compensation error SADsb corresponding to the pixel Psb on the right of the search origin pixel Ps0 is smaller than the motion compensation errors SADs0 and SADsa corresponding to the search origin pixel Ps0 and the pixel Psa on its left (see the relationship (1)). Accordingly, in the following second step, the search for the pixels Ps0 and Psc which are on the left and right of the pixel Psb is performed.

The motion compensation error SADsc corresponding to the pixel Psc is smaller than the motion compensation errors SADs0 and SADSb corresponding to the pixels Ps0 and Psb (see the relationships (1) and (2)). Therefore, in the third step, the search for the pixels Psb and Psd which are on the left and right of the pixel Psc is performed.

The motion compensation error SADsc corresponding to the pixel Psc is smaller than the motion compensation errors SADsb and SADsd corresponding to the pixels Psb and Psd (see the relationship (2)) Therefore, in the fourth step, the search for the pixels Pse and Psf which are on the upper and lower sides of the pixel Psc is performed.

The motion compensation error SADse corresponding to the pixel Pse is smaller than the motion compensation errors SADsc and SADsf corresponding to the pixels Psc and Psf (see the relationship (3)). Therefore, in the fifth step, the search for the pixels Psg and Psh which are on the left and right of the pixel Pse is performed.

The motion compensation error SADse corresponding to the pixels Pse is smaller than the motion compensation errors SADsg and SADsh corresponding to the pixels Psg and Psh (see the relationship (3)). Therefore, in the sixth step, the search for the pixels Psi and Psc which are on the upper and lower sides of the pixel Pse is performed. In this case, the motion compensation error SADse corresponding to the pixel Pse is smaller than the motion compensation errors SADsi and SADsc corresponding to the pixels Psi and Psc (see the relationship (3)). Therefore, a motion vector indicating the position of the pixel Pse is decided as the motion vector for the block to be processed.

The numbers in the marks ○ for showing pixels in FIG. 16 show pixels which are newly added as search targets in the respective first to sixth steps. For example, the number in the mark ○ for showing the pixel Psc is "2". This number "2" means that this pixel Psc is newly added as the search target in the second step.

As described above, in the prior art motion vector detection process, the number of calculation times for image error data is substantially reduced by the efficient motion vector search such as the hierarchical motion vector search or "One at a time" search. However, in recent years, the demand for the miniaturization of devices or energy savings is becoming increasingly exacting. Accordingly, there emerges the need for further reducing the number of calculation times for error data in the motion vector detection process.

Needless to say, the coding efficiency for image signals (image quality improvement at a prescribed bit rate) is critical in a use for the above-mentioned energy-saving micro image displaying device. However, the number of calculation times in the processes which require a large operation amount, such as the motion vector detection, should be further more reduced.

SUMMARY OF THE INVENTION

It is an object of the present invention to provide a motion vector detection method and a motion vector detection apparatus which can reduce the number of calculation times in the motion vector detection process which requires a large operation amount, with almost no deterioration in the coding efficiency for the image signals, thereby reducing the consumed power, and a data storage medium which contains a program for causing a computer to execute a process of detecting a motion vector by the motion vector detection method.

Other objects and advantages of the present invention will become apparent from the detailed description and specific embodiments described are provided only for illustration since various additions and modifications within the spirit and scope of the invention will be apparent to those of skill in the art from the detailed description.

A motion vector detection method according to a 1st aspect of the present invention, including a motion vector detection process of searching a position of a prediction block, corresponding to a block to be processed as a processing target, on a reference frame under a prescribed condition, for each block comprising a predetermined number of pixels as a unit for processing image data of a frame to be processed, thereby to detect information indicating the position of the prediction block as a motion vector corresponding to the block to be processed, comprises: a calculation process of calculating an error of image data between a block corresponding to a motion vector search origin as a position where search of the position of the prediction block is started, and the block to be processed as the processing target, as a motion compensation error corresponding to the motion vector search origin; and a comparison process of comparing a motion compensation error corresponding to a neighboring block in the vicinity of the block to be processed, which is an error of image data between the neighboring block and a prediction block corresponding thereto, with the motion compensation error corresponding to the motion vector search origin, and switching between outputting positional information indicating the motion vector search origin as the motion vector corresponding to the block to be processed, according to a comparison result between both of the motion compensation errors, as the motion vector corresponding to the block to be processed, and outputting a motion vector which is obtained by performing the motion vector detection process with the motion vector search origin as a search starting position, as the motion vector corresponding to the block to be processed.

According to a 2nd aspect of the present invention, the motion vector detection method of the 1st aspect comprises: when the motion compensation error corresponding to the motion vector search origin is smaller than the motion compensation error corresponding to the neighboring block, outputting the positional information indicating the motion vector search origin as it is as the motion vector corresponding to the block to be processed.

According to a 3rd aspect of the present invention, the motion vector detection method of the 1st aspect comprises: when the motion compensation error corresponding to the motion vector search origin is smaller than the motion compensation error corresponding to the neighboring block and the motion compensation error corresponding to the motion vector search origin is smaller than a predetermined value, outputting the positional information indicating the motion vector search origin as it is, as the motion vector corresponding to the block to be processed.

According to a 4th aspect of the present invention, the motion vector detection method of the 3rd aspect comprises: when a motion detection instruction signal is input from outside, outputting a motion vector which is obtained by performing the motion vector detection process with the motion vector search origin as the search starting position, as the motion vector corresponding to the block to be processed, regardless of size relationship between the motion compensation error corresponding to the neighboring block and the motion compensation error corresponding to the motion vector search origin.

According to a 5th aspect of the present invention, the motion vector detection method of the 1st aspect comprises: when a magnitude of a difference between the motion compensation error corresponding to the neighboring block and the motion compensation error corresponding to the motion vector search origin is smaller than a predetermined value, outputting the positional information indicating the motion vector search origin as it is, as the motion vector corresponding to the block to be processed.

A motion vector detection method according to a 6th aspect of the present invention, of searching a position of a prediction block, corresponding to a block to be processed as a processing target, on a reference frame under a prescribed condition, for each block comprising a predetermined number of pixels as a unit for processing image data of a frame to be processed, thereby to detect information indicating the position of the prediction block as a motion vector corresponding to the block to be processed, comprises: a process of searching the position of the prediction block in a first search range which is set on the reference frame, and calculating a first motion compensation error as an error of image data between a block on the reference frame, which block is specified by a first candidate motion vector corresponding to the block to be processed, and the block to be processed on the processed frame; a process of searching the position of the prediction block in a second search range on the reference frame in the vicinity of a pixel position indicated by the first candidate motion vector, and calculating a second motion compensation error as an error of image data between a block on the reference frame, which block is specified by a second candidate motion vector corresponding to the block to be processed, and the block to be processed on the processed frame; a process of searching the position of the prediction block in a third search range on the reference frame, which range is set on the basis of the first candidate motion vector and second candidate motion vector, and calculating a third motion compensation error as an error of image data between a block on the reference frame, which block is specified by a third candidate motion vector corresponding to the block to be processed, and the block to be processed on the processed frame; and a process of comparing the first, second, and third motion compensation errors, and selecting one of the first, second, and third candidate motion vectors as the motion vector corresponding to the block to be processed, according to a result of the comparison.

According to a 7th aspect of the present invention, in the motion vector detection method of the 6th aspect, the third search range is set in a region other than the first and second search ranges on the reference frame; and the position of the prediction block is searched in the third search range without referring to the first and second motion compensation errors.

According to an 8th aspect of the present invention, in the motion vector detection method of the 6th aspect, in the first search range, the position of the prediction block is searched in pixel units; and in the third search range, the position of the prediction block is searched by interpolating a pixel value corresponding to a virtual pixel between pixels of the reference frame and with precision higher than ½-pixel precision.

According to a 9th aspect of the present invention, in the motion vector detection method of the 6th aspect, in the second search range, the position of the prediction block is searched only in a vertical or horizontal direction on the reference frame, and in the third search range, the position of the prediction block is searched in a direction other than the direction of the second search range.

A motion vector detection apparatus according to a 10th aspect of the present invention, which performs a motion vector detection process of searching a position of a prediction block, corresponding to a block to be processed as a processing target, on a reference frame under a prescribed condition, for each block comprising a predetermined number of pixels as a unit for processing image data of a frame to be processed, thereby to detect information indicating the position of the prediction block, as a motion vector corresponding to the block to be processed, comprises: an error calculation unit for calculating an error of image data between a block corresponding to a motion vector search origin as a position where search of the position of the prediction block is started, and the block to be processed as the processing target, as a motion compensation error corresponding to the motion vector search origin; a comparison unit for comparing a motion compensation error corresponding a neighboring block in the vicinity of the block to be processed, which is an error of image data between the neighboring block and a prediction block corresponding thereto, with the motion compensation error corresponding to the motion vector search origin; a decision unit for deciding whether the motion vector detection process for the block to be processed is to be performed, according to a result of the comparison of the motion compensation errors; a motion detection unit for detecting a motion vector by performing the motion vector detection process with the motion vector search origin as a search starting position, only when the decision unit decides that the motion vector detection process is to be performed; a selection unit for outputting the motion vector detected by the motion detection unit as the motion vector corresponding to the block to be processed when the decision unit decides that the motion vector detection process is to be performed, and outputting positional information indicating the motion vector search origin as it is as the motion vector corresponding to the block to be processed, when the decision unit decides that the motion vector detection process is not to be performed; and a memory for temporarily containing the motion compensation error corresponding to the motion vector output from the selection unit, as data for deciding whether the motion vector detection process for other blocks is to be performed.

A motion vector detection apparatus according to an 11th aspect of the present invention, for searching a position of a prediction block, corresponding to a block to be processed as a processing target, on a reference frame under a prescribed condition, for each block comprising a predetermined number of pixels as a unit for processing image data of a frame to be processed, thereby to detect information indicating the position of the prediction block as a motion vector corresponding to the block to be processed, comprises: a first motion detection unit for searching the position of the prediction block in a first search range which is set on the reference frame, and calculating a first motion compensation error as an error of image data between a block on the reference frame, which block is specified by a first candidate motion vector corresponding to the block to be processed, and the block to be processed on the processed frame; a second motion detection unit for searching the position of the prediction block in a second search range on the reference frame, which is in the vicinity of a pixel position indicated by the first candidate motion vector, and calculating a second motion compensation error as an error of image data between a block on the reference frame, which block is specified by a second candidate motion vector corresponding to the block to be processed, and the block to be processed; a third motion detection unit for searching the position of the prediction block in a third search range on the reference frame, which is set on the basis of the first candidate motion vector and second candidate motion vector, and calculating a third motion compensation error as an error of image data between a block on the reference frame, which block is specified by a third candidate motion vector corresponding to the block to be processed, and the block to be processed; and a selection unit for comparing the first, second, third motion compensation errors, and selecting one of the first, second, third candidate motion vectors as the motion vector corresponding to the block to be processed, according to a result of the comparison.

A data storage medium according to a 12th aspect of the present invention contains a program, and in the data storage medium, the program makes a computer perform a process of detecting a motion vector corresponding to a block to be processed, according to the motion vector detection method of the 1st aspect.

A data storage medium according to a 13th aspect of the present invention, contains a program, and in the data storage medium, the program makes a computer perform a process of detecting a motion vector corresponding to a block to be processed, according to the motion vector detection method of the 6th aspect.

According to the 1st, 2nd, 3rd, 4th, 5th, 10th, and 12th aspects of the present invention, the number of times of error calculation which requires the largest operation amount can be reduced without scarcely deteriorating the motion detection precision. Accordingly, the consumed power can be reduced, for example. Therefore, the motion vector detection process having a high practicality can be realized.

According to the 6th, 7th, 8th, 9th, 11th, and 13th aspects, the third search range can be efficiently narrowed and the number of error calculation times can be reduced.

DETAILED DESCRIPTION OF THE PREFERRED EMBODIMENTS

Figure 1:
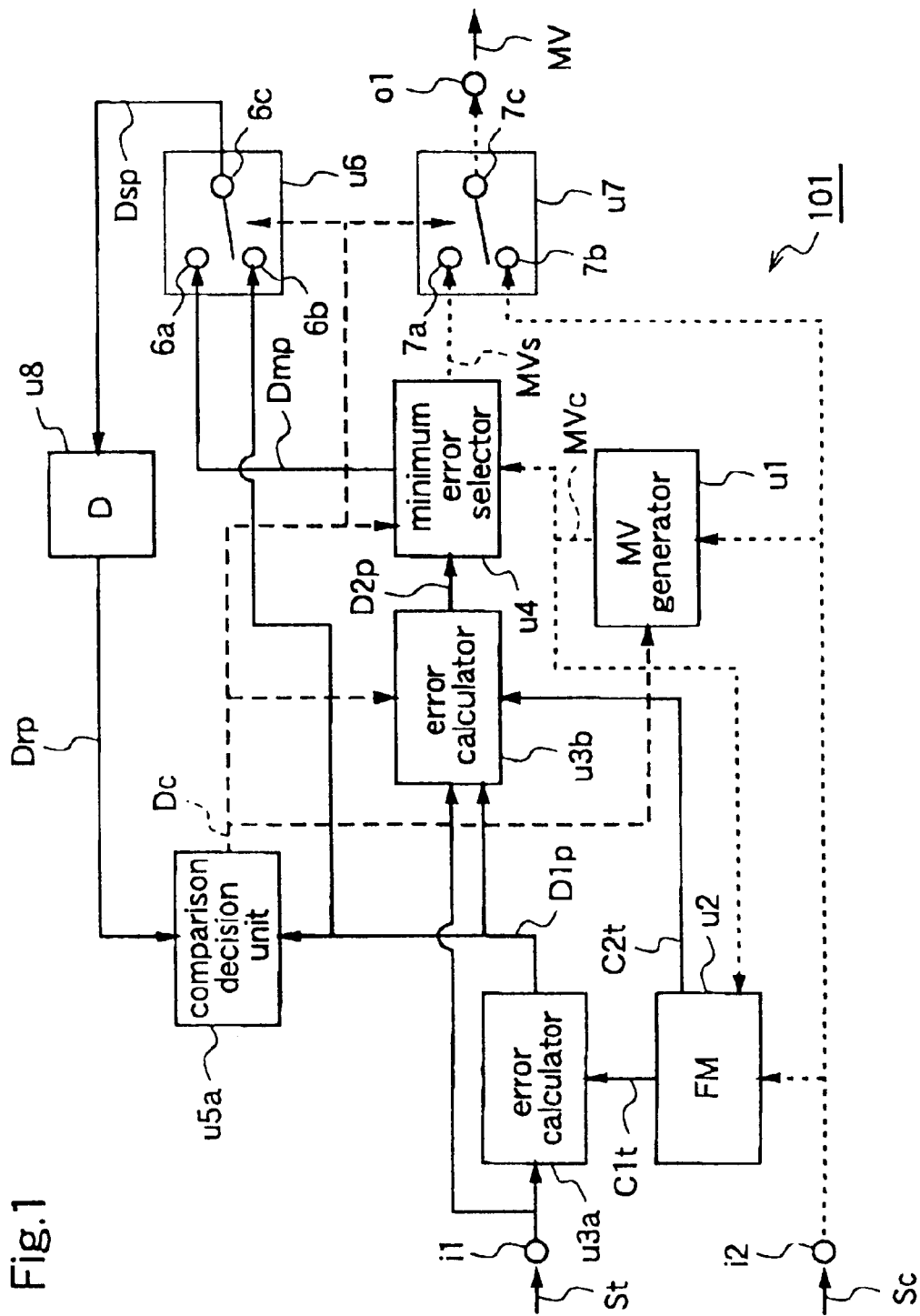
FIG. 1 is a block diagram illustrating a motion vector detection apparatus according to a first embodiment of the present invention.

Hereinafter, embodiments of the present invention will be described.

Embodiment 1

Initially, a fundamental principle of a first embodiment of the present invention is described.

Usually, an image signal has a strong correlation of local pixel values. Therefore, a target block on a frame to be processed and a neighboring block adjacent to the target block have almost the same motion vectors or motion compensation errors.

Consequently, when the pixel value correlation is strong, even if motion vector search origin information for obtaining a motion vector for the target block is predicted from a motion vector of the neighboring block and this predicted motion vector search origin information is used as the motion vector corresponding to the target block, the detection precision for the motion vector of the target block is scarcely deteriorated.

However, when the target block and the neighboring block include pixels of objects having different motions, respectively, the correlation of pixels between the target block and the neighboring block is lost. In this case, the motion vector or motion compensation error of the target block is also substantially different from that of the neighboring block.

Accordingly, when the motion vector search origin information of the target block is predicted from the motion vector of the neighboring block, a motion compensation error corresponding to the motion vector search origin is compared with a motion compensation error corresponding to the neighboring block, and the motion vector detection process is switched according to a result of the comparison, whereby the operation amount in the motion detection process for the target block can be reduced without so much deteriorating the detection precision for the motion vector of the target block.

To be specific, according to the result of the comparison between the motion compensation error for the motion vector search origin and the motion compensation error for the neighboring block, when a difference between the motion compensation errors is small, the motion vector search origin information corresponding to the target block is used as a motion vector for the target block. On the other hand, when the difference between the motion compensation errors is large, a motion vector which is obtained by performing the motion vector detection with the motion vector search origin of the target block as a search starting position is used as the motion vector for the target block.

In addition, when the motion compensation error for the motion vector search origin of the target block is smaller than the motion compensation error of the neighboring block, the pixel value correlation between the neighboring block and the target block is low. Accordingly, there is a risk that the motion vector search origin which is predicted from the neighboring block is different from an optimal motion vector for the target block. However, since the motion compensation error of the target block is small, even when the positional information indicating the motion vector search origin is selected as the motion vector of the target block, it can be considered to have no problem in practical use.

Accordingly, instead of outputting a result of deciding that the positional information indicating that the motion vector search origin is used as the motion vector of the target block (motion detection cancel decision) when the magnitude of the difference between the motion compensation errors is smaller than the predetermined value, a decision signal indicating that the positional information which indicates the motion vector search origin being used as the motion vector of the target block (motion detection cancel decision) can be output when the motion compensation error for the search origin of the target block is smaller than the motion compensation error of the neighboring block.

FIG. 1 is a block diagram illustrating a motion vector detection apparatus according to the first embodiment.

Figure 15:
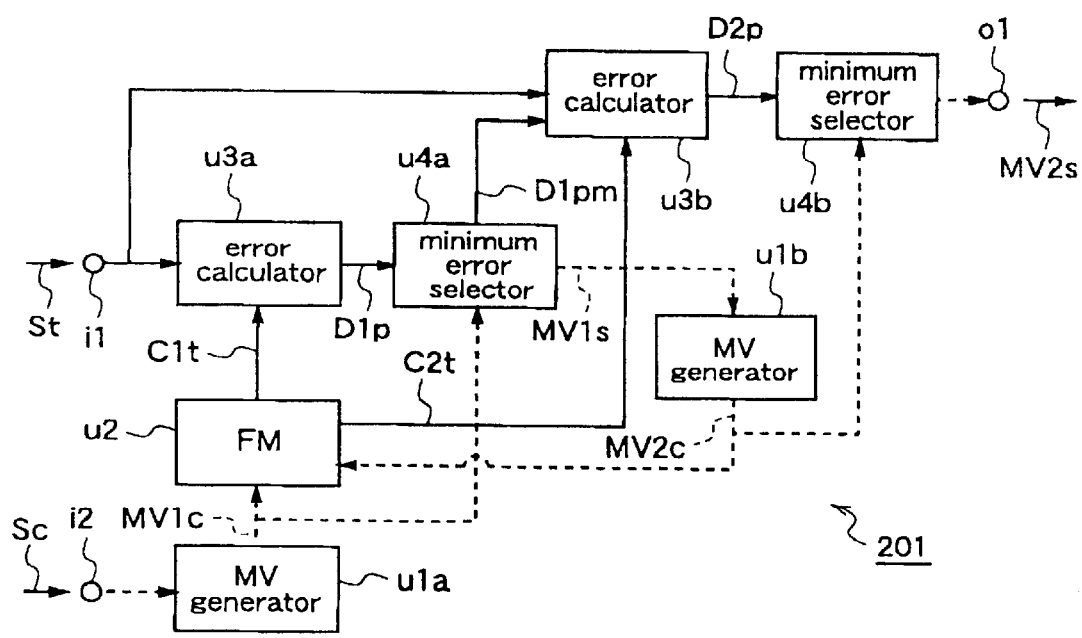
FIG. 15 is a block diagram for explaining a prior art hierarchical motion vector detection apparatus.

The motion vector detection apparatus 101 of the first embodiment detects a motion vector corresponding to the target block by the two-hierarchy search process. In this apparatus, in the first hierarchy search process, a motion compensation error for motion vector search origin information Sc which is input from outside is calculated. Therefore, this motion detection apparatus 101 does not has the motion vector generator u1a and the minimum error selector u4a of the prior art hierarchical motion vector detection apparatus 201 as shown in FIG. 15.

The motion vector detection apparatus 101 of the first embodiment comprises a frame memory u2 for containing image data of a reference frame, and an error calculator u3a for calculating an error between image data of a specified block on the reference frame, which is indicated by information Sc indicating a motion vector search origin from outside, and image data of a target block. In this motion vector detection apparatus 101, the frame memory u2 and the error calculator u3a constitutes a first hierarchy motion detector.

In addition, the motion vector detection apparatus 101 comprises a MV generator u1 for generating plural candidate motion vectors MVc with a pixel position indicated by the motion vector search origin information Sc from outside as the search origin, an error calculator u3b for calculating error data D2p between motion compensation data (second motion compensation data) C2t which is read from the frame memory u2 on the basis of the candidate motion vectors MVc, and the input image data St of the target block, and a minimum error selector u4 for selecting a candidate motion vector corresponding to the minimum error from the plural candidate motion vectors MVc on the basis of the error data D2p, as a second hierarchy motion vector MVs. In this motion vector detection apparatus 101, the frame memory u2, the MV generator u1, the error calculator u3b, and the minimum error selector u4 constitute a second hierarchy motion detector.

Further, the motion vector detection apparatus 101 comprises a first selector u6 for selecting either of error data D1p which is output from the error calculator u3a and minimum error data Dmp which is output from the minimum error selector u4, in accordance with a control signal Dc, and outputting selected data as selected error data Dsp, and a second selector u7 for selecting either of the motion vector search origin information Sc which is input from outside and the second hierarchy motion vector MVs which is output from the minimum error selector u4, in accordance with the control signal Dc, and outputting selected motion vector as a motion vector MV of the target block.

In the selector u6, the minimum error data Dmp from the minimum error selector u4 is input to a first input node 6a and the error data D1p output from the error calculator u3a is input to a second input node 6b, and one of these data is output from an output node 6c as the selected error data Dsp. In the selector u7, the second hierarchy motion vector MVs from the minimum error selector u4 is input to a first input node 7a and the motion vector search origin information Sc from outside is input to a second input node 7b, and one of these data is output from an output node 7c as the motion vector MV of the target block.

Further, the motion vector detection apparatus 101 comprises a temporary storage memory u8 for temporarily containing the selected error data Dsp, and a comparison decision unit u5a for comparing motion compensation error Drp of a neighboring block, which is read from the temporary memory u8, and the motion compensation error D1p corresponding to the motion vector search origin, which is calculated by the error calculator u3a, and outputting a result of a comparison decision indicating whether the motion vector search process by the second hierarchy motion detector is canceled, as the control signal Dc.

Other constituents of the motion vector detection apparatus 101 are the same as that of the prior art motion vector detection apparatus 201.

Figure 2:
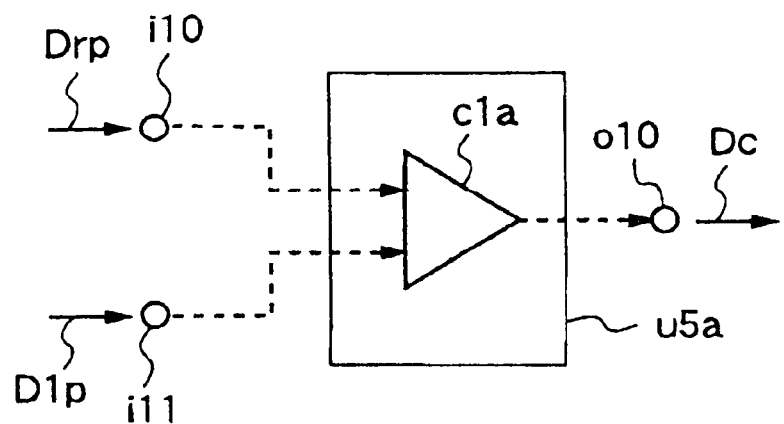
FIG. 2(a) is a diagram illustrating a structure of a comparison decision unit as a constituent of the motion vector detection apparatus of the first embodiment.
FIG. 2(b) is a diagram illustrating a structure of a variation thereof.
Figure 2:
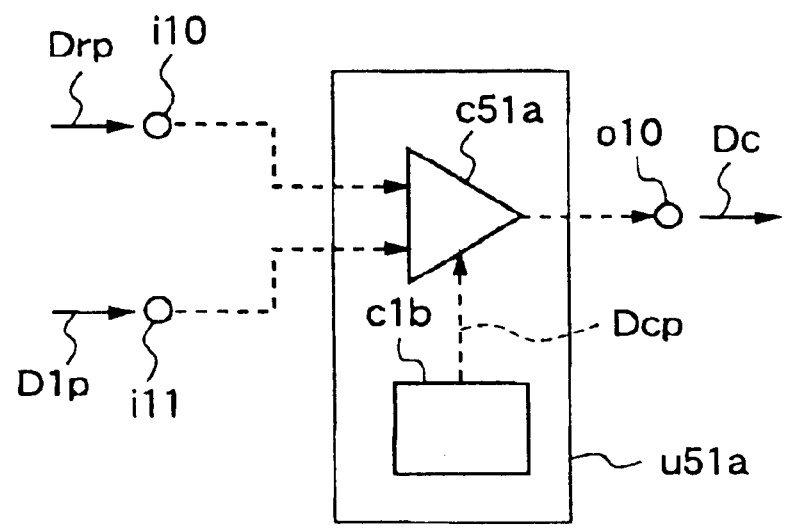

FIG. 2(a) is a diagram illustrating a detailed structure of the comparison decision unit u5a as a constituent of the motion vector detection apparatus 101 as shown in FIG. 1.

This comparison decision unit u5a comprises a comparator c1a for comparing the motion compensation error Drp of the neighboring block with the motion compensation error D1p (corresponding to the output of the error calculator u3a in FIG. 1) corresponding to the motion vector search origin Sc of the target block. This unit u5a outputs the decision signal Dc indicating the comparison decision result according to the size relationship of the motion compensation errors. In FIG. 2(a), the motion compensation error Drp of the neighboring block is input to an input terminal i10 and the motion compensation error D1p corresponding to the motion vector search origin Sc is input to an input terminal i11. The decision signal Dc is output from an output terminal o10.

When the motion compensation error D1p for the motion vector search origin is smaller than the motion compensation error Drp for the neighboring block, this comparison decision unit u5a outputs the decision signal Dc indicating that the second hierarchy search process is canceled. When the motion compensation error D1p for the motion vector search origin is the motion compensation error Drp for the neighboring block or larger, this unit u5a outputs the decision signal Dc indicating that the second hierarchy search process is performed.

In the motion vector detection apparatus 101 of the first embodiment, when the comparison decision unit u5a outputs the decision signal Dc indicating that the second hierarchy search process is canceled, the operation processings in the error calculator u3b, the minimum error selector u4, and the MV generator u1 are stopped. In the selector u6, the error data D1p from the error calculator u3a is selected. In the selector u7, the motion vector search origin information Sc input from outside is selected. On the other hand, when the comparison decision unit u5a outputs the decision signal Dc indicating that the second hierarchy search process is performed, the operation processings in the error calculator u3b, the minimum error selector u4, and the MV generator u1 are performed. In the selector u6, the minimum error data Dmp from the minimum error calculator u4 is selected. In the selector u7, the second hierarchy motion vector MVs from the minimum error calculator u4 is selected.

Next, functions and effects are described.

Hereinafter, an operation of the motion vector detection apparatus 101 in FIG. 1 will be described.

The motion compensation error (error data) Drp corresponding to the neighboring block processed one block before the target block as a processing target is stored in the temporary memory u8. In the comparison decision unit u5a, the motion compensation error Drp of the neighboring block, which is read from the temporary memory u8 is compared with the motion compensation error D1p for the motion vector search origin information Sc of the target block, which is calculated by the error calculator u3a, and the comparison decision result indicating whether the second hierarchy motion vector search process is canceled is output as the decision signal Dc.

To be specific, when the motion compensation error D1p for the motion vector search origin is smaller than the motion compensation error Drp for the neighboring block, this comparison decision unit u5a outputs the decision signal Dc indicating that the second hierarchy search process is canceled. On the other hand, when the motion compensation error D1p for the motion vector search origin is the motion compensation error Drp for the neighboring block or larger, the decision unit u5a outputs the decision signal Dc indicating the second hierarchy search process is not canceled.

When the comparison decision unit u5a decides that the second hierarchy search process is canceled, it is notified the MV generator u1, the error calculator u3b, and the minimum error selector u4 by the decision signal Dc that the operation processings are not required. Then, the error calculator u3b, the minimum error selector u4, and the MV generator u1 do not perform the operation processings for the second hierarchy search process. On the other hand, when the comparison decision unit u5a decides that the second hierarchy search process is not canceled, it is notified the MV generator u1, the error calculator u3b, and the minimum error selector u4 by the decision signal Dc that the operation processings are required. Then, the error calculator u3b, the minimum error selector u4, and the MV generator u1 perform the operation processings for the second hierarchy search process.

In this case, in the selector u7, when the decision signal Dc indicates the cancel of the second hierarchy search process, the motion vector search origin information Sc is selected and output as the motion vector MV of the target block. On the other hand, when the decision signal Dc indicates that the second hierarchy search process is not canceled, the motion vector MVs selected by the minimum error selector u4 is output as the motion vector MV of the target block.

Similarly, in the selector u6, when the decision signal Dc indicates the cancel of the second hierarchy search process, the motion compensation error D1p corresponding to the motion vector search origin information Sc is selected and output to the temporary memory u8. On the other hand, when the decision signal Dc indicates that the second hierarchy search process is not canceled, the motion compensation error Dmp corresponding to the motion vector MVs, which is selected by the minimum error selector u4, is output to the temporary memory u8.

In the first embodiment constructed as above, the comparison decision unit u5a refers to the motion compensation error Drp corresponding to the detected motion vector of the neighboring block, and decides a case where the coding efficiency is not improved by the second hierarchy motion search. Therefore, unnecessary second hierarchy motion search process can be stopped, thereby reducing the number of error calculation times in the motion vector detection process.

In the comparison decision unit u5a, when the motion compensation error D1p for the motion vector search origin of the target block is smaller than the motion compensation error Drp of the neighboring block, the motion vector search origin information Sc is selected as the motion vector of the target block. In this case, there is a risk that the pixel value correlation between the neighboring block and the target block is low and the motion vector search origin predicted from the neighboring block is different from an optimal motion vector of the target block. However, this can be considered to have no problem in practical use, because the motion compensation error D1p for the motion vector search origin is small.

In this first embodiment, whether the second hierarchy search process is canceled or not is decided according to the size relationship between the motion compensation error D1p for the motion vector search origin of the target block and the motion compensation error Drp for the neighboring block. However, the decision can be performed in another manner of canceling the second hierarchy search process when the magnitude of a difference between the motion compensation error D1p and the motion compensation error Drp is smaller than a prescribed value, and not canceling the second hierarchy search process when the difference is the prescribed value or larger.

FIG. 2(b) is a diagram illustrating a comparison decision unit u51a having the above-mentioned structure.

This comparison decision unit u51a comprises a reference value generator c1b for generating the prescribed reference value Dcp, and a comparison decision unit c51a for comparing the magnitude of a difference between of the motion compensation error D1p and the motion compensation error Drp, with the prescribed reference value Dcp, and outputting the decision signal Dc. When the magnitude of the difference is smaller than the prescribed value, this comparison decision unit c51a outputs the decision signal Dc indicating that the second hierarchy search process is canceled. When the difference is the prescribed value or larger, the decision unit c51a outputs the decision signal Dc indicating that the second hierarchy search process is not canceled.

Embodiment 2

Figure 3:
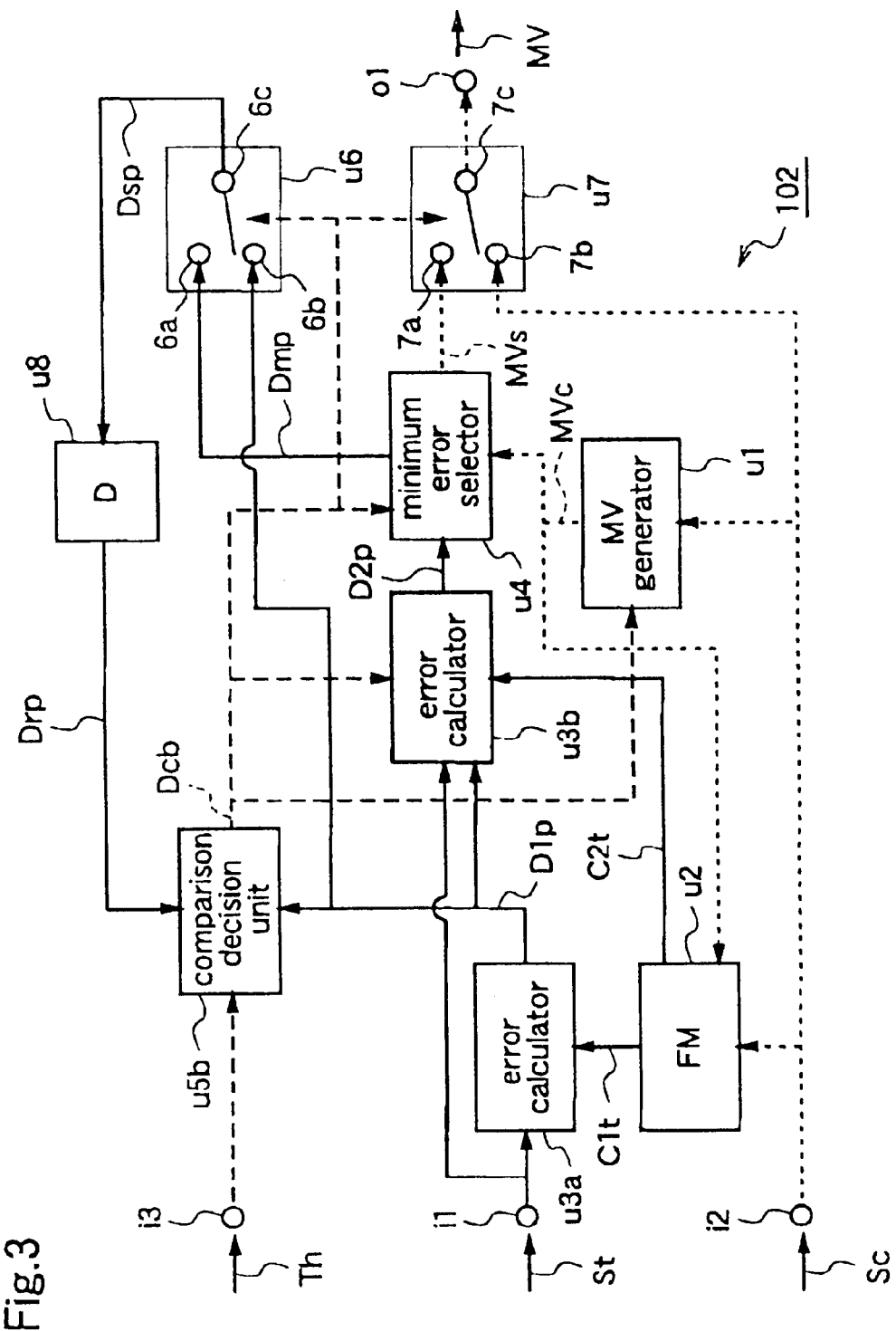
FIG. 3 is a block diagram illustrating a motion vector detection apparatus according to a second embodiment of the present invention.

FIG. 3 is a block diagram illustrating a motion vector detection apparatus according to a second embodiment of the present invention.

The motion vector detection apparatus 102 of the second embodiment comprises, in place of the comparison decision unit u5a in the motion vector detection apparatus of the first embodiment, a comparison decision unit u5b for outputting the decision signal Dc indicating whether the second hierarchy motion search is canceled, on the basis of the size relationship between the motion compensation error Drp corresponding to the detected motion vector of the neighboring block and the motion compensation error D1p corresponding to the motion vector search origin of the target block and a threshold value Th which is input from outside. Other constituents of the motion vector detection apparatus 102 are the same as that of the motion vector detection apparatus 101 of the first embodiment. In FIG. 3, the threshold Th is input to a third input terminal i3 in the motion vector detection apparatus 102.

Figure 4:
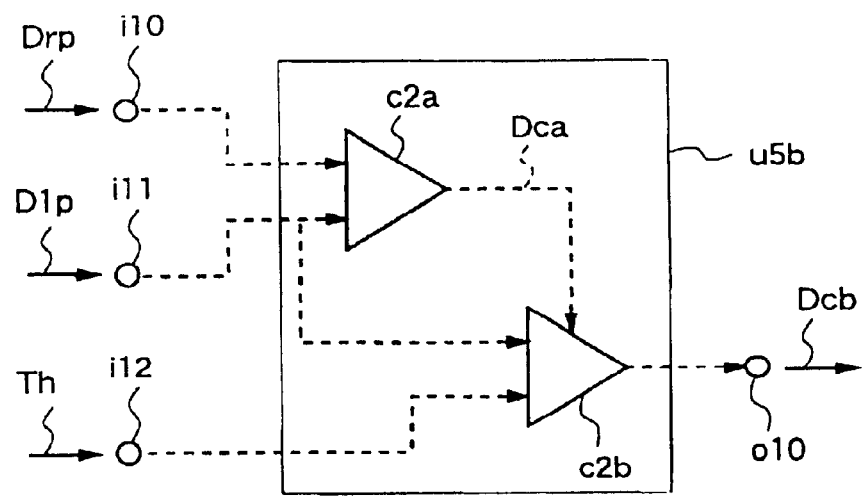
FIG. 4 is a diagram illustrating a structure of a comparison decision unit as a constituent of the motion vector detection apparatus of the second embodiment.

FIG. 4 is a diagram illustrating a detailed structure of the comparison decision unit u5b as a constituent of the motion vector detection apparatus 102 as shown in FIG. 3.

The comparison decision unit u5b comprises a first comparator c2a for comparing the motion compensation error Drp corresponding to the neighboring block, which is read from the temporary memory u8, with the motion compensation error D1p corresponding to the motion vector search origin information Sc, which is calculated by the error calculator u3a, and a second comparator c2b for comparing the motion compensation error D1p corresponding to the motion vector search origin information Sc, with the threshold Th which is input from outside.

Here, the threshold Th is an acceptable value of the motion compensation error corresponding to the target block, which is decided according to the bit rate of coded data output from the inter-frame motion compensation coding apparatus and the number of operation times for motion compensation errors in the motion vector detection apparatus. In addition, when the motion compensation error D1p for the motion vector search origin is smaller than the motion compensation error Drp for the neighboring block, the first comparator c2a outputs a decision signal Dca indicating that the second hierarchy search process is canceled. When the motion compensation error D1p for the motion vector search origin is the motion compensation error Drp for the neighboring block or larger, the first comparator c2a outputs the decision signal Dca indicating that the second hierarchy search process is performed. Further, when the motion compensation error D1p for the motion vector search origin is smaller than the threshold Th, the second comparator c2b outputs the decision signal Dca output from the first comparator c2a as it is as a decision signal Dcb. When the motion compensation error D1p for the motion vector search origin is the threshold Th or larger, the second comparator c2b outputs the decision signal Dcb indicating that the second hierarchy search process is not canceled (i.e., the second hierarchy search process is performed), regardless of the decision signal Dca from the first comparator c2a.

In FIG. 4, the threshold Th from outside the motion vector detection apparatus 102 is input to a third input terminal i12 of the comparison decision unit u5b.

Next, functions and effects are described.

Initially, a fundamental principle of the second embodiment will be briefly described.

In the first embodiment, the motion compensation error Drp for the detected motion vector of the neighboring block is simply compared with the motion compensation error D1p for the motion vector search origin of the target block, and thereby the decision signal Dc indicating the comparison decision result is generated. However, when the precision in the motion detection for the neighboring block is low and the motion compensation error for the neighboring block is large, even when the motion compensation error which is obtained by performing the motion compensation for the target block on the basis of the motion vector search origin information Sc is large, the second hierarchy motion detection process is canceled. Accordingly, the motion vector search origin information Sc with low precision is output as the motion vector MV of the target block.

Thus, in this second embodiment, the acceptable value of the motion compensation error, which is decided according to the bit rate of coded data output from the inter-frame motion compensation coding apparatus and the number of operation times for the motion compensation errors in the motion vector detection apparatus, is given to the comparison decision unit u5b as the threshold Th. Accordingly, when the motion compensation error obtained by performing the motion compensation for the target block on the basis of the motion vector search origin information Sc is larger than the threshold Th, the cancel of the second hierarchy motion detection process can be stopped.

Next, an operation will be described.

In the motion vector detection apparatus 102 of the second embodiment, operations of the elements other than the comparison decision unit u5b are the same as those of the motion vector detection apparatus 101 of the first embodiment. Therefore, only the operation of the comparison decision unit u5b is described hereinafter.

In the comparison decision unit u5b, the motion compensation error Drp corresponding to the neighboring block, which is read from the temporary memory u8 is compared with the motion compensation error D1p corresponding to the motion vector search origin, which is calculated by the error calculator u3a. Further, the motion compensation error D1p for the motion vector search origin information Sc is compared with the threshold Th input from outside.

Then, the comparison decision unit u5b outputs the comparison decision signal Dcb indicating whether the second hierarchy motion detection is canceled, on the basis of results of the comparisons in the respective comparators c2a and c2b.

When the decision unit u5b decides the cancel of the second hierarchy motion detection process, it is notified to the motion vector generator u1, the error calculator u3b, and the minimum error selector u4 by the decision signal Dcb that the processings are not required.

Hereinafter, a detailed operation of the comparison decision unit u5b will be described.

Initially, in the comparison decision unit u5b, like the comparison decision unit u5a of the first embodiment, the motion compensation error Drp for the neighboring block is compared with the motion compensation error D1p for the motion vector search origin of the target block by the comparator c2a. When the motion compensation error D1p for the motion vector search origin is smaller than the motion compensation error Drp for the neighboring block, the decision signal Dca indicating the cancel of the second hierarchy search process is output from the comparator c2a. On the other hand, when the motion compensation error D1p for the motion vector search origin is the motion compensation error Drp for the neighboring block or larger, the decision signal Dca indicating that the second hierarchy search process is not canceled is output from the comparator c2a.

At this time, the motion compensation error D1p for the motion vector search origin of the target block is compared with the threshold Th by the comparator c2b. When the motion compensation error D1p is smaller than the threshold Th, the output Dca of the comparator c2a is output as it is as the comparison decision signal Dcb. When the motion compensation error D1p is the threshold Th or larger, the decision signal Dcb indicating that the second hierarchy motion search process is performed (i.e., the second hierarchy search process is not canceled) is output, regardless of the decision output Dca of the comparator c2a.

In the second embodiment constructed as above, the motion compensation error D1p on the basis of the motion vector search origin information Sc is compared with the threshold Th which is input from outside, in the comparison decision unit u5b. Then, when the motion compensation error which is obtained by performing the motion compensation for the target block on the basis of the motion vector search origin information Sc is larger than the threshold, the second hierarchy motion search process is always performed. Therefore, the precision in the motion detection is improved.

In this second embodiment, when the motion compensation error D1p for the motion vector search origin of the target block is smaller than the motion compensation error Drp for the neighboring block, the comparator c2a in the comparison decision unit u5b outputs the decision signal Dca indicating the cancel of the second hierarchy detection process. when the motion compensation error D1p for the motion vector search origin of the target block is the motion compensation error Drp of the neighboring block or larger, the comparator c2a outputs the decision signal Dca indicating that the second hierarchy detection process is performed. However, like the comparator C51a as shown in FIG. 2(b), this comparator c2a can have a structure of. outputting the decision signal Dca indicating the cancel of the second hierarchy search process when the magnitude of the difference between the motion compensation error D1p and the motion compensation error Drp is smaller than the prescribed reference value Dcp, and outputting the decision signal Dca indicating that the second hierarchy search process is not canceled when the difference is the prescribed value Dcp or larger.

Embodiment 3

Figure 5:
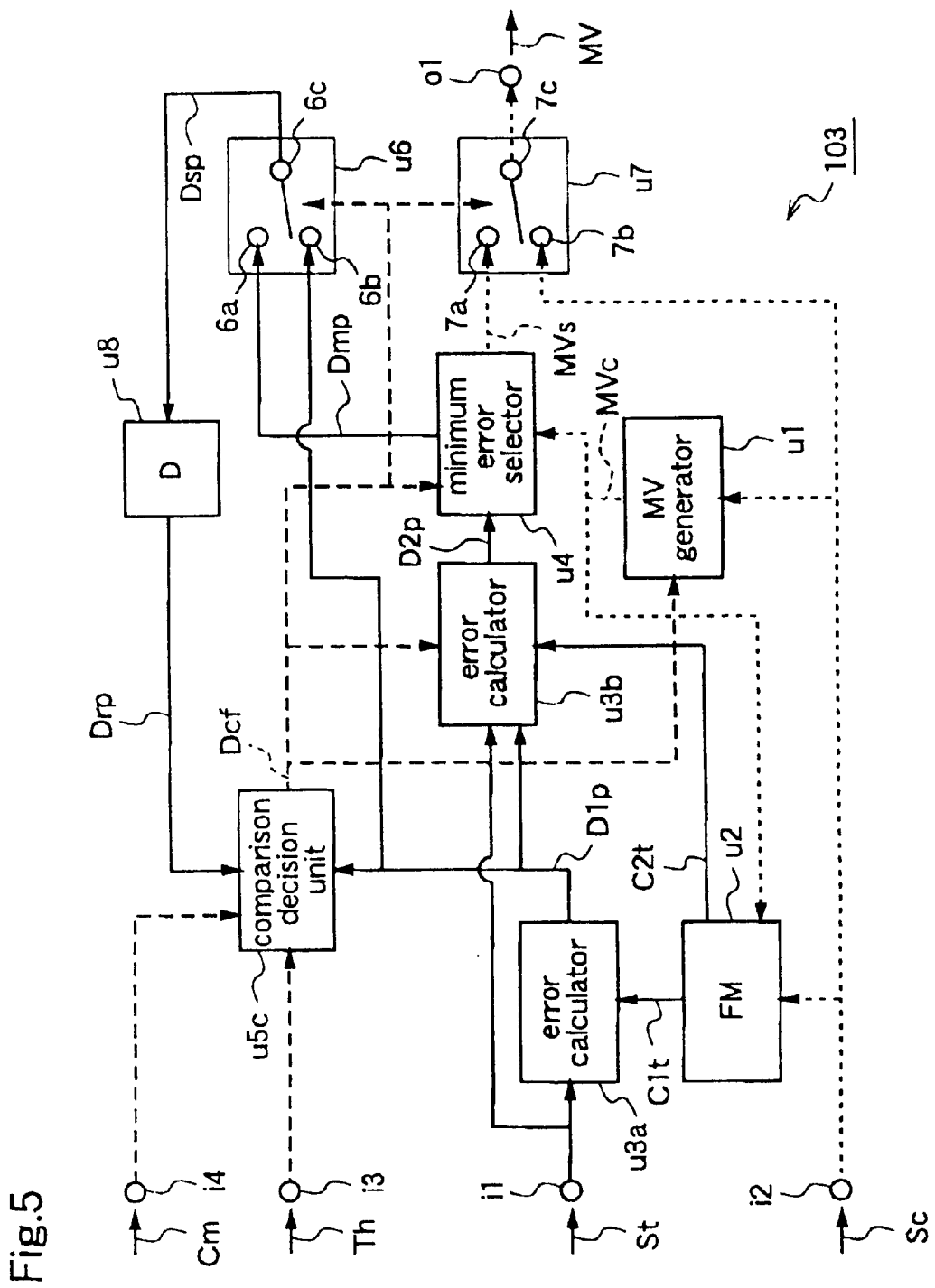
FIG. 5 is a block diagram illustrating a motion vector detection apparatus according to a third embodiment of the present invention.

FIG. 5 is a block diagram illustrating a motion vector detection apparatus according to a third embodiment of the present invention.

The motion vector detection apparatus 103 of the third embodiment comprises, in place of the comparison decision unit u5b in the motion vector detection apparatus of the second embodiment, a comparison decision unit u5c for outputting a decision signal Dcf indicating whether the second hierarchy motion search is canceled, on the basis of the size relationship between the motion compensation error Drp corresponding to the detected motion vector of the neighboring block and the motion compensation error D1p corresponding to the motion vector search origin of the target block, the threshold Th input from outside, and a second hierarchy motion detection instruction signal Cm. Other constituents of the apparatus 103 are the same as those of the motion vector detection apparatus 102 of the second embodiment. In FIG. 5, the second hierarchy motion detection instruction signal Cm is input to a fourth input terminal i4 of the motion vector detection apparatus 103.

Figure 6:
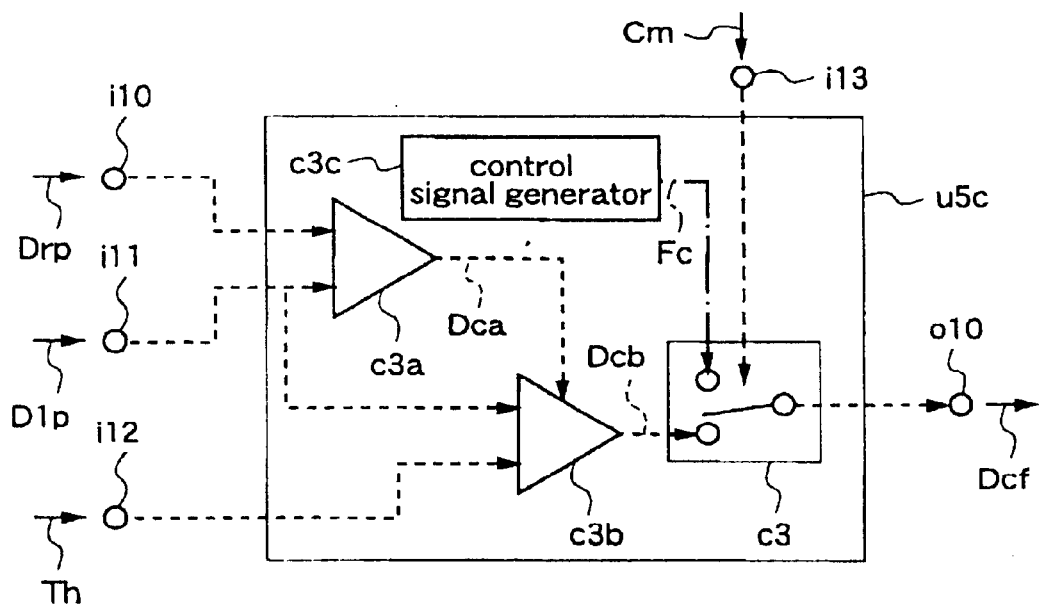
FIG. 6 is a diagram illustrating a structure of a comparison decision unit as a constituent of the motion vector detection apparatus of the third embodiment.

FIG. 6 is a diagram illustrating a detailed structure of the comparison decision unit u5c as a constituent of the motion vector detection apparatus 103 as shown in FIG. 5.

This comparison decision unit u5c comprises comparators c3a and c3b having the same structures as those of the comparators c2a and c2b in the comparison decision unit u5b of the second embodiment, a control signal generator c3c for generating a control signal Fc, and a selector c3 for selecting either of an output Dcb of the -second comparator c3b and the control signal Fc, on the basis of the second hierarchy motion detection instruction signal Cm which is input from outside.

When the second hierarchy motion detection instruction signal Cm is input from outside, the selector c3 selects the control signal Fc. When the second hierarchy motion detection instruction signal Cm is not input, the selector c3 selects the output Dcb of the second comparator c3b. As a device for outputting the second hierarchy motion detection instruction signal Cm, which is outside the motion vector detection apparatus 103, an intra-frame/inter-frame coding mode decision unit for deciding a coding mode for the target block or the neighboring block can be used.

Next, functions and effects are described.

Initially, a fundamental principle of the third embodiment is briefly described.

When the neighboring block in the vicinity of the target block is a block having no motion vector, i.e., the neighboring block is a block which is processed first in a processed frame or a block on edges of the frame, or when the neighboring block is an intra-block which was subjected to the intra-frame coding, the motion vector search origin information Sc which is predicted from a motion vector of the block in the vicinity of the target block is considered to have a low reliability. When the neighboring block is the intra-block which was subjected to the intra-frame coding, in many cases, the motion compensation error for the target block is large and the motion vector of the target block has no reliability.

Therefore, in these situations, the second hierarchy motion detection instruction signal Cm from the device such as the intra-frame/inter-frame coding mode decision unit outside the motion vector detection apparatus 103 instructs to the comparison decision unit u5c that the motion vector search origin Sc has a low reliability. Then, the comparison decision unit u5c outputs the decision signal Dcf indicating that the second hierarchy motion detection is performed, thereby further increasing the precision in the motion detection.

Next, an operation will be described.

In the motion vector detection apparatus 103 of the third embodiment, all operations of elements other than the comparison decision unit u5c are the same as those of the motion vector detection apparatus 102 of the second embodiment as shown in FIG. 3. Therefore, only the operation of the comparison decision unit u5c is described hereinafter.

Initially, in the comparison decision unit u5c shown in FIG. 6, like the comparison decision unit u5b in FIG. 4, the motion compensation error Drp for the neighboring block is compared with the motion compensation error D1p for the motion vector search origin of the target block by the comparator c3a. Further the motion compensation error D1p for the motion vector search origin is compared with the threshold Th input from outside, by the comparator c3b.

Then, the comparison decision unit u5c outputs the comparison decision signal Dcf indicating whether the second hierarchy motion vector search is canceled, on the basis of results of the comparisons in the respective comparators c3a and c3b and whether the second hierarchy motion detection instruction signal Cm is input. When the decision unit u5c decides that the second hierarchy motion vector search is canceled, it is notified to the motion vector generator u1, the error calculator u3b, and the minimum error selector u4 by the decision signal Dcf that the processings are not required.

Hereinafter, a detailed operation of the comparison decision unit u5c will be described.

Initially, in the comparison decision unit u5c, like the comparison decision unit u5a of the second embodiment, the motion compensation error Drp for the neighboring block is compared with the motion compensation error D1p for the motion vector search origin of the target block, by the comparator c3a. When the motion compensation error D1p for the motion vector search origin is smaller than the motion compensation error Drp for the neighboring block, the decision signal Dca indicating that the second hierarchy search process is canceled is output from the comparator c3a. On the other hand, when the motion compensation error D1p for the motion vector search origin is the motion compensation error Drp for the neighboring block or larger, the decision signal Dca indicating that the second hierarchy search process is not canceled is output from the comparator c3a.

At this time, in the comparator c3b, the motion compensation error D1p for the motion vector search origin of the target block is compared with the threshold Th. As a result of this comparison, when the motion compensation error D1p for the motion vector search origin is smaller than the threshold Th, the output Dca of the comparator c3a is output as it is as the comparison decision signal Dcb. On the other hand, when the motion compensation error D1p for the motion vector search origin is the threshold Th or larger, the decision signal Dcb indicating that the second hierarchy motion vector search is performed (i.e., the second hierarchy search process is not canceled) is output, regardless of the decision output Dca of the comparator c3a.

When the second hierarchy motion detection instruction signal cm is input to the selector c3, the selector c3 selects the control signal Fc and outputs the signal Fc as a final decision data Dcf. On the contrary, when the second hierarchy motion detection instruction signal Cm is not input to the selector c3, the selector c3 selects the decision signal Dcb from the comparator c3b and outputs the signal Dcb as the final decision data Dcf.

As described above, in this third embodiment, the decision result indicating that the second hierarchy motion vector search is performed is compulsorily output from the comparison decision unit u5c, by using the second hierarchy motion detection instruction signal Cm from outside. Therefore, the precision in the motion vector detection can be further improved with relative to the motion vector detection apparatus 102 of the second embodiment as shown in FIG. 3.

In this third embodiment, when the motion compensation error D1p for the motion vector search origin of the target block is smaller than the motion compensation error Drp for the neighboring block, the comparator c3a in the comparison decision unit u5c outputs the decision signal Dca indicating that the second hierarchy motion vector search process is canceled. And when the motion compensation error D1p for the motion vector search origin of the target block is the motion compensation error Drp for the neighboring block or larger, the comparator c3a outputs the decision signal Dca indicating that the second hierarchy motion vector search process is performed. However, like the comparator c51a as shown in FIG. 2(b), this comparator c3a can have a structure of outputting the decision signal Dca indicating that the second hierarchy motion vector search process is canceled when the magnitude of the difference between the motion compensation error D1p and the motion compensation error Drp is smaller than the prescribed reference value Dcp, and outputting the decision signal Dca indicating that the second hierarchy motion vector search process is not canceled when the difference is the prescribed value Dcp or larger.

Figure 13:
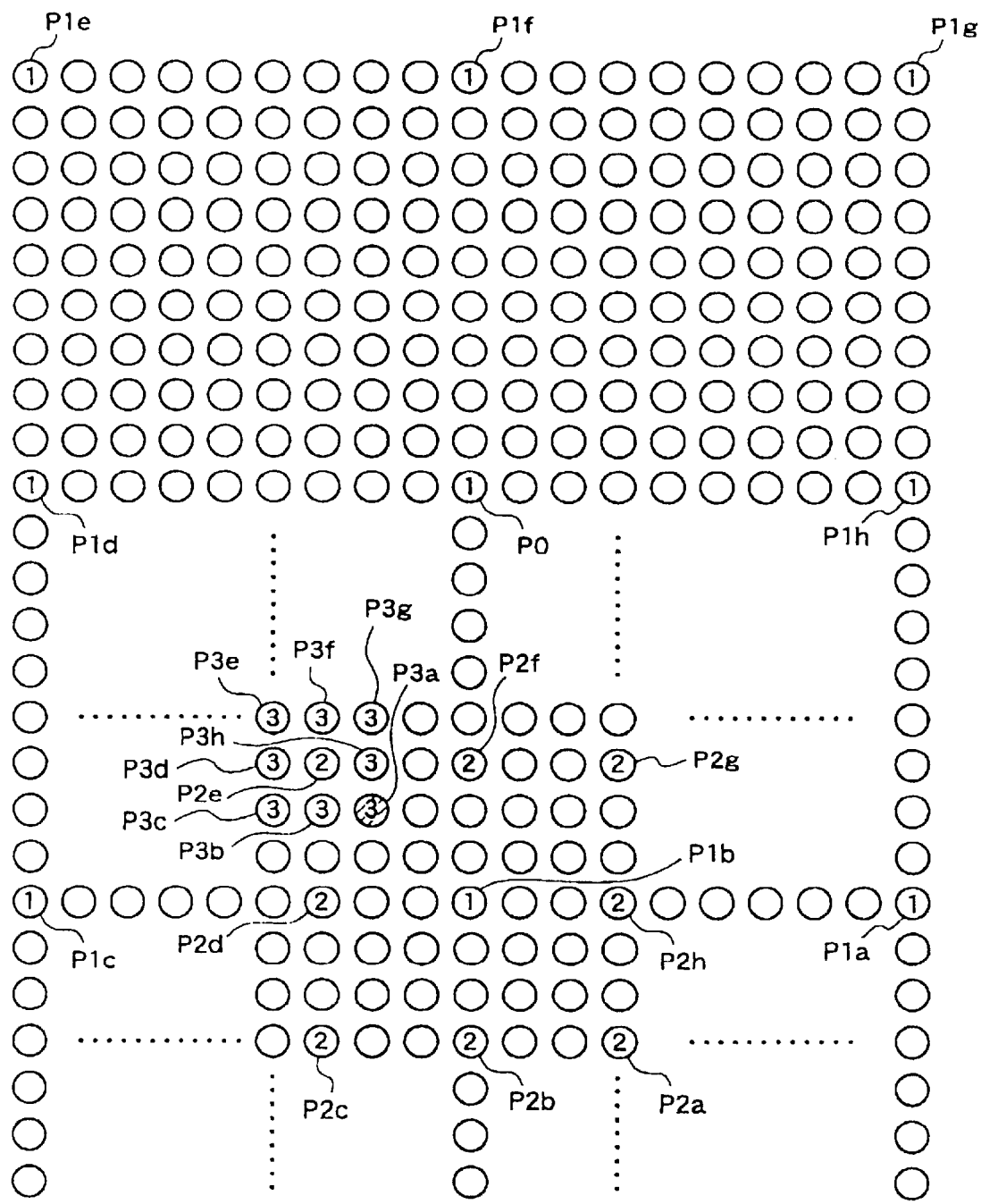
FIG. 13 is a diagram for explaining a prior art motion vector detection method (three-step method).
Figure 14:
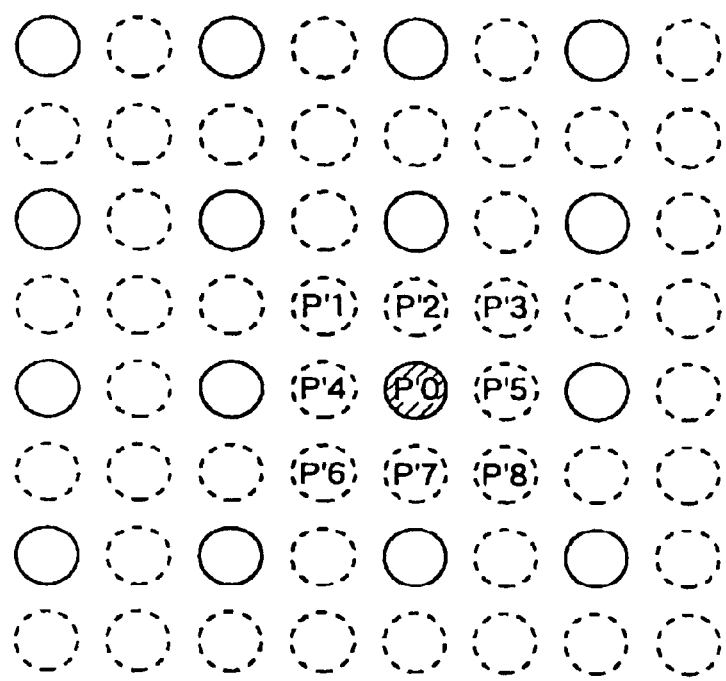
FIG. 14 is a diagram for explaining a prior art motion vector detection method (½-pixel precision search).
Figure 16:
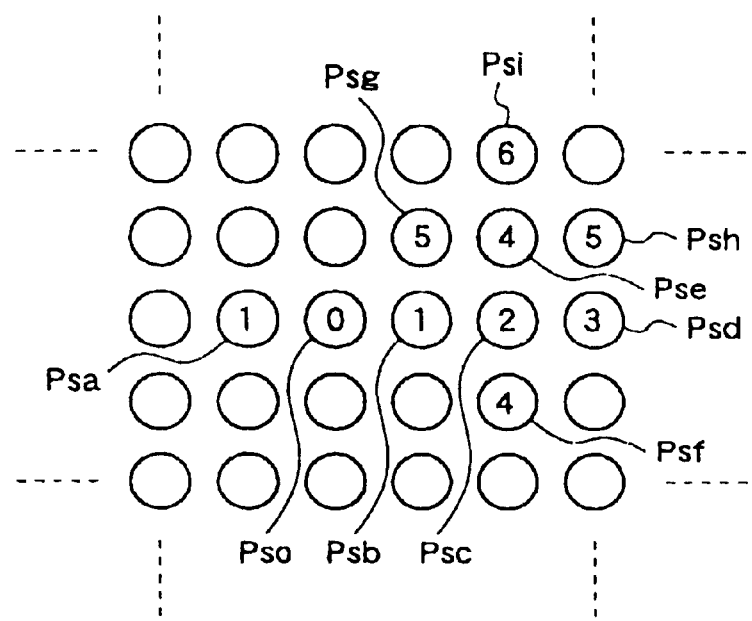
FIG. 16 is a diagram for explaining a prior art motion vector detection method (One at a time).

In the first to third embodiments, the second hierarchy motion vector search process, i.e., the process of performing the motion vector search with the motion vector search origin as the search starting position, to detect the motion vector for the target block is not described in detail. However, in the second hierarchy motion vector search process, the motion vector detection method such as the prior art three-step method as shown in FIG. 13, another prior art hierarchical motion vector detection method as shown in FIG. 14, and "One at a time" method as shown in FIG. 16 is used.

Embodiment 4

A motion vector detection apparatus according to a fourth embodiment of the present invention will be described.

Initially, a fundamental principle of the motion vector detection apparatus of the fourth embodiment is described.

Figure 7:
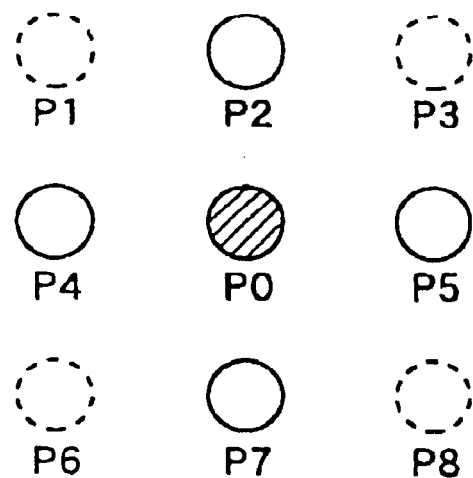
FIG. 7 is a diagram for explaining a fundamental principle of a motion vector detection apparatus according to a fourth embodiment of the present invention.

FIG. 7 is a diagram for explaining an operation principle of the motion vector detection apparatus of this fourth embodiment. This figure illustrates pixels on a reference frame, which are referred to in the motion vector detection process (hereinafter referred to also as a motion detection process).

In FIG. 7, a reference pixel P0 is at a position which is indicated by a motion vector found in the first hierarchy search process. There are surrounding pixels P1 to P8 around the reference pixel P0. The positions of these surrounding pixels P1 to P8 are virtual pixel positions which are indicated by motion vectors having precision higher than the integer pixel precision such as the ½-pixel precision. Pixel values of these pixels are generated by interpolating pixel values of existing pixels.

Figure 8:
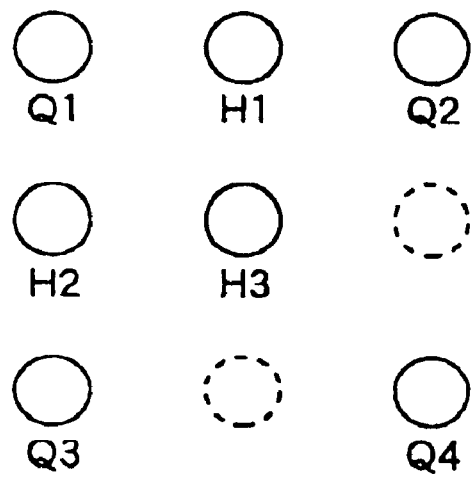
FIG. 8 is a diagram for explaining the fundamental principle of the motion vector detection apparatus according to the fourth embodiment.

FIG. 8 is a diagram for explaining the operation of the motion vector detection apparatus of the fourth embodiment. This figure shows an example of a concrete method of interpolating the pixel values.

In FIG. 8, the reference frame is constituted by actual pixels Q1, Q2, Q3 and Q4 and these pixels are situated at positions corresponding to corners of a prescribed square on the reference frame. The respective pixels Q1, Q2, Q3 and Q4 have pixel values q1, q2, q3 and q4, respectively.

A virtual pixel H1 is situated in the middle of the pixels Q1 and Q2. A virtual pixel H2 is situated in the middle of the pixels Q1 and Q3. A virtual pixel H3 is situated in the middle of the pixels Q1 and Q4. Pixel values h1, h2, and h3 of these virtual pixels H1, H2, and H3 are usually given by following expressions (1), (2), and (3), respectively:

$$h1=(q1+q2)/2 \quad (1)$$

$$h2=(q1+q3)/2 \quad (2)$$

$$h3=(q1+q2+q3+q4)/4 \quad (3)$$

In the motion detection process with precision higher than the integer pixel precision (high pixel precision motion detection), the pixels values of the virtual pixels, which are virtually arranged at positions on the reference frame where no pixel exist, should be generated by the interpolation process. Therefore, the operation amount is increased with relative to the motion detection process with the integer pixel precision. However, the motion vector which is obtained by the high pixel precision motion detection process can express even a small motion of a small image with high precision. Therefore, the motion compensation error is reduced in the motion compensation process using this motion vector. Further, the above-mentioned interpolation process of the pixel values is equal to a low-pass filter. Therefore, it is also known that this interpolation process has an effect of suppressing high-frequency noises.

In the motion detection process with precision higher than the integer pixel precision, this effect of suppressing the high-frequency noises cannot be ignored. Accordingly, even when the motion compensation error for the motion vector indicating the pixel P0 in FIG. 7 is smaller than motion compensation errors corresponding to the pixels P2, P4, P5, and P7, the motion compensation errors for motion vectors indicating the pixels P1, P3, P6, and P8 are often smaller than the motion compensation error corresponding to the pixel P0.

However, when the motion detection is performed for all of the pixels P1, P3, P6, and P8, the number of error calculation times is increased. Accordingly, in the second hierarchy search process, the motion compensation errors are calculated for four motion vectors of the reference pixel, which indicate the positions of the pixels P2, P4, P5, and P7, and a pixel position Pi having the minimum motion compensation error is detected from the pixels P2, P4, P5, and P7. Then, in the third hierarchy search process, the search is performed for two motion vectors indicating pixel positions which are adjacent to the pixel position Pi among the pixels P1, P3, P6, and P8.

Finally, the motion compensation errors corresponding to the motion vectors which are obtained by the first, second, third hierarchy search processes are compared with each other. Then, a motion vector having the minimum motion compensation error is decided as the motion vector of the target block.

This method is similar to the prior art hierarchical three-step method. However, the prior art three-step method selects one motion vector having the minimum motion compensation error for each hierarchy, while the method of the fourth embodiment selects one motion vector having the minimum motion compensation error from the motion vectors which are obtained by the respective hierarchy search processes.

For example, in the prior art three-step method, when the motion compensation error corresponding to the position of the pixel P0 in FIG. 7 is smaller than the motion compensation errors corresponding to the positions of the pixels P2, P4, P5, and P7 in FIG. 7, the motion vector indicating the position of the pixel P0 is selected in the second hierarchy. Then, in the third hierarchy search process, no criterion exists for narrowing the search range from the four candidates of pixels P1, P3, P6, P8. On the other hand, in this fourth embodiment, the pixel P0 indicated by a motion vector which is obtained in the first hierarchy search is not considered in the second hierarchy search. Accordingly, either of the pixels P2, P4, P5, and P7 is detected as a pixel position Pi having the minimum motion compensation error. Therefore, in the third hierarchy search process, the search range can be narrowed from four candidates of the pixels P1, P3, P6 and P8, using the pixel position Pi as criterion.

Figure 9:
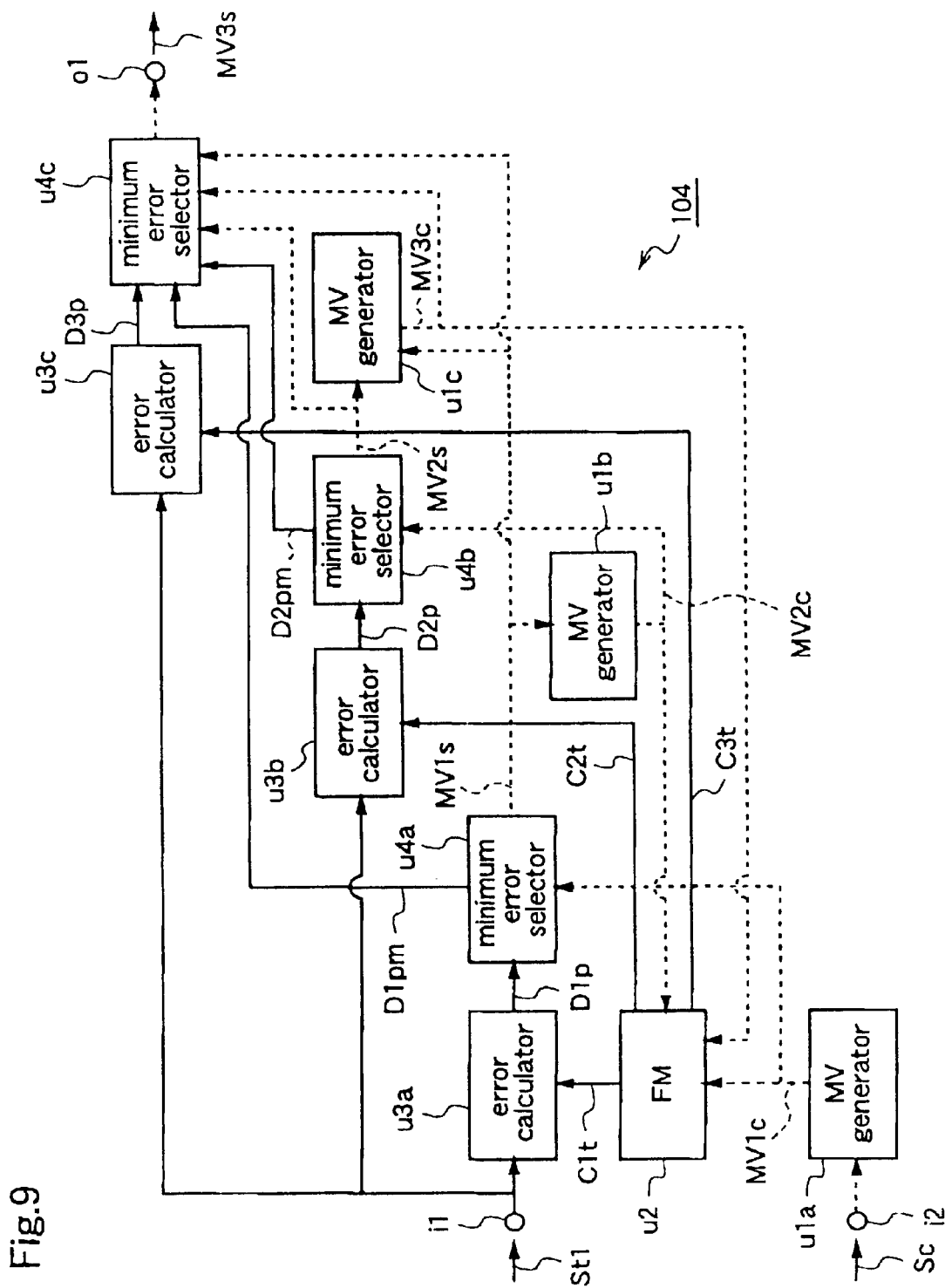
FIG. 9 is the block diagram illustrating the motion vector detection apparatus of the fourth embodiment.

FIG. 9 is a block diagram illustrating a motion vector detection apparatus according to the fourth embodiment.

The motion vector detection apparatus 104 of the fourth embodiment comprises, in addition to the structure of the prior art motion vector detection apparatus 201, a motion vector generator u1c for generating plural candidate motion vectors MV3c in accordance with the second hierarchy motion vector MV2s selected by the minimum error selector u4b and the first hierarchy motion vector MV1s selected by the minimum error selector u4a, an error calculator u3c for calculating an error between image data C3t read from the frame memory u2, corresponding to a specified block of a reference image which is specified by the candidate motion vectors MV3c, and the image data Sc of the input target block, and a minimum error selector u4c for selecting a motion vector having the minimum motion compensation error from three motion vectors corresponding to respective hierarchies, which are obtained by first, second, and third hierarchy search processes, and outputting the selected motion vector as a motion vector MV3s corresponding to the target block. In this motion vector detection apparatus 104, the MV generator u1c, the error calculator u3c, the minimum error selector u4c, and the frame memory u2 constitute a third hierarchy motion vector detector.

The motion vector generator u1c detects the candidate motion vectors MV3c indicating pixel positions in the third search range which does not include the first hierarchy search range and the second hierarchy search range, which ranges are defined by the motion vector MV1s of the first hierarchy and the motion vector MV2s of the second hierarchy. In addition, the first and second selected motion vectors MV1s and MV2s from the minimum error selector u4a and u4b, the first and second motion compensation errors D1pm and D2pm, the plural candidate motion vectors MV3c from the motion vector generator u1c, and the motion compensation error D3p from the error calculator u3c are input to the minimum error selector u4c. Then, in the minimum error selector u4c, the process of selecting a motion vector by the third hierarchy search, and the process of selecting a motion vector having the minimum motion compensation error from three motion vectors corresponding to the respective hierarchies, which are selected by the first, second, third hierarchy search processes are performed together.

In this fourth embodiment, the second hierarchy motion vector detector constituted by the MV generator u1b, the error calculator u3b, the minimum error selector u4b, and the frame memory u2 detects the second hierarchy motion vector MV2s in the second search range in the vicinity of the pixel position which is indicated by the motion vector MV1s obtained by the first hierarchy search process. That is, the minimum error selector u4b does not consider the motion vector MV1s which is output from the minimum error selector u4a of the first hierarchy motion vector detector but selects a motion vector having the minimum motion compensation error from the candidate motion vectors MV2c generated by the MV generator u1b, as the second hierarchy motion vector MV2s.

Here, the pixel position which is indicated by the motion vector MV1s is the position of the pixel P0 in FIG. 7. In addition, the second search range is an image space comprising the pixels P2, P4, P5, and P7 in FIG. 7. When the second hierarchy motion vector MV2s indicates the position of the pixel P7, the third search range is an image space comprising the pixels P6 and P8 in FIG. 7.

Next, an operation will be described.

In the motion vector detection apparatus 104 of the fourth embodiment, the first hierarchy search process is similar to the prior art hierarchical motion vector detection apparatus 201. However, the first, second, and third hierarchy search processes are described here.

In the motion vector detection apparatus 104, on the basis of the vector search origin information Sc supplied from outside the apparatus, the motion vector generator u1a outputs motion vectors indicating plural pixel positions in the vicinity of the search origin, as the candidate motion vectors MV1c. Then, the frame memory u2 outputs an image signal (motion compensation data) C1t corresponding to the specified block on the reference frame, which is indicated by the candidate motion vectors MV1c. The error calculator u3a calculates a differential signal (image error data) D1p between the motion compensation data C1t and the image signal St1 of the target block. The minimum error selector u4a monitors the image error data D1p, selects a candidate motion vector MV1c having the minimum error data D1p from the plural candidate motion vectors MV1c, and outputs the candidate motion vector MV1c as a selected motion vector (first hierarchy motion vector) MV1s. For example, this selected motion vector (first hierarchy motion vector) MV1s indicates the position of the pixel P0 in FIG. 7.

When the first hierarchy motion vector MV1s is input to the second hierarchy motion detector in the motion vector detection apparatus 104, the MV generator u1b of the second hierarchy motion detection unit generates plural second candidate motion vectors MV2c corresponding to neighboring positions of the pixel position on the reference frame, which is indicated by the first hierarchy motion vector MV1s. For example, these second candidate motion vectors MV2c indicate the positions of the pixels P2, P4, P5, and P7 in FIG. 7.

At this time, image data (motion compensation data) C2t read from the frame memory u2, corresponding to a specified block on the reference frame, which is indicated by the second candidate motion vectors MV2c is input to the error calculator u3b. Then, the error calculator u3b calculates error data D2p between the motion compensation data C2t and the image data St of the target block.

In addition, the plural candidate motion vectors MV2c generated by the MV generator u1b and the error data D2p corresponding to the respective motion vectors MV2c are input to the minimum error selector u4b. Then, in the minimum error selector u4b, a candidate motion vector MV2c having the minimum error data is selected and output as the second hierarchy motion vector (selected motion vector) MV2s. For example, the second hierarchy motion vector (selected motion vector) MV2s indicates the position of the pixel P7 in FIG. 7.

Further, when the second hierarchy motion vector MV2s from the minimum error selector u4b and the first hierarchy motion vector MV1s from the minimum error selector u4a are input to the motion vector generator u1c of the third hierarchy motion detector, the motion vector generator u1c generates plural candidate motion vectors MV3c corresponding to pixels in the third search range which does not include the first and second search ranges defined by these motion vectors MV1s and MV2s. For example, these plural candidate motion vectors MV3c indicate the positions of the pixel P6 and P8 in FIG. 7.

Then, the motion compensation data C3t corresponding to the plural candidate motion vectors MV3c is read from the frame memory u2. The error calculator u3c calculates the error data D3p between the motion compensation data C3t corresponding to the candidate motion vectors MV3c and the image data St of the input target block.

Further, in the minimum error selector u4c, a motion vector having the minimum motion compensation error is selected from the selected motion vectors MV1s and MV2s corresponding to the target block, which are obtained by the first and second hierarchy search processes and the candidate motion vectors MV3c obtained by the third hierarchy motion search process, and output as the motion vector MV3s of the target block.

As described above, in this fourth embodiment, the motion vector MV2s which indicates the pixel position in a range other than the search range of the first hierarchy and has the minimum motion compensation error is detected in the second hierarchy. Then, the third hierarchy search range is decided on the basis of the two motion vectors detected by the first and second hierarchy search processes. Then, the motion vector corresponding to the target block is detected from the motion vectors obtained by the third hierarchy search process and the motion vectors obtained by the first and second hierarchy search processes. Therefore, the third hierarchy search range can be narrowed efficiently, thereby reducing the number of error calculation times in the motion vector detection.

In this fourth embodiment, in the second search range, the position of the prediction block is searched in the vertical and horizontal directions on the reference frame, with the pixel position indicated by the first selected motion vector MV1s as the search origin. Then, in the third search range, the position of the prediction block is searched only in the horizontal direction on the reference frame, with the pixel position indicated by the second selected motion vector MV2s as the search origin. However, the search directions in the second and third search ranges are not limited to these.

For example, in the second search range, the position of the prediction block can be searched only in the vertical or horizontal direction on the reference frame, with the pixel position indicated by the first selected motion vector MV1s as the search origin. Then, in the third search range, the position of the prediction block can be searched in directions other than the search direction in the second search range, with the pixel position indicated by the second selected motion vector MV2s as the search origin.

Further, when a motion detection program for realizing the motion vector detection process in the motion vector detection apparatus according to any of the aforementioned embodiments is recorded in a storage medium such as a floppy disk, the motion vector detection process according to any of the aforementioned embodiments can be easily implemented in a computer system.

Figure 10:
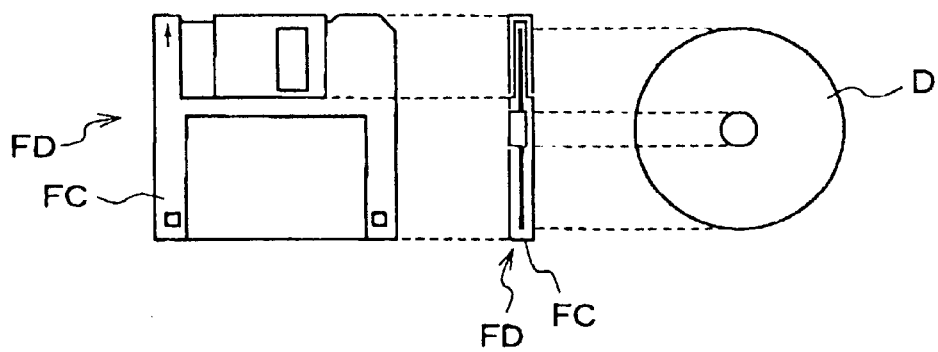
FIGS. 10(a) and 10(b) are diagrams for explaining a data storage medium which contains a program for implementing the motion detection process according to any of the above embodiments by a computer system.
FIG. 10(c) is a diagram for explaining the computer system.
Figure 10:
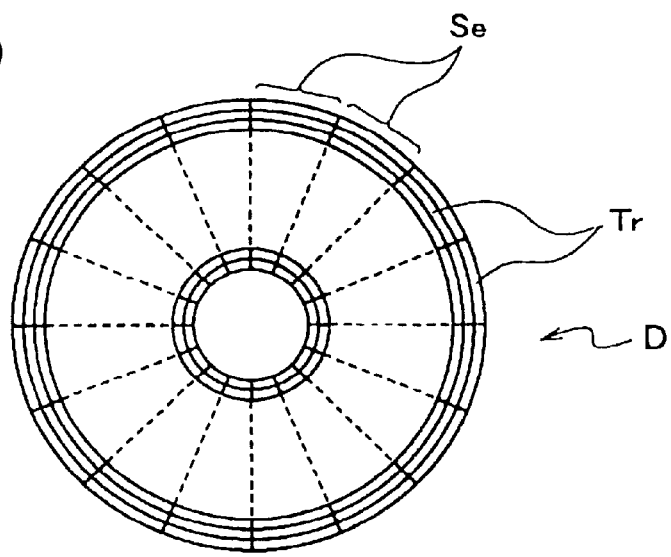
Figure 10:
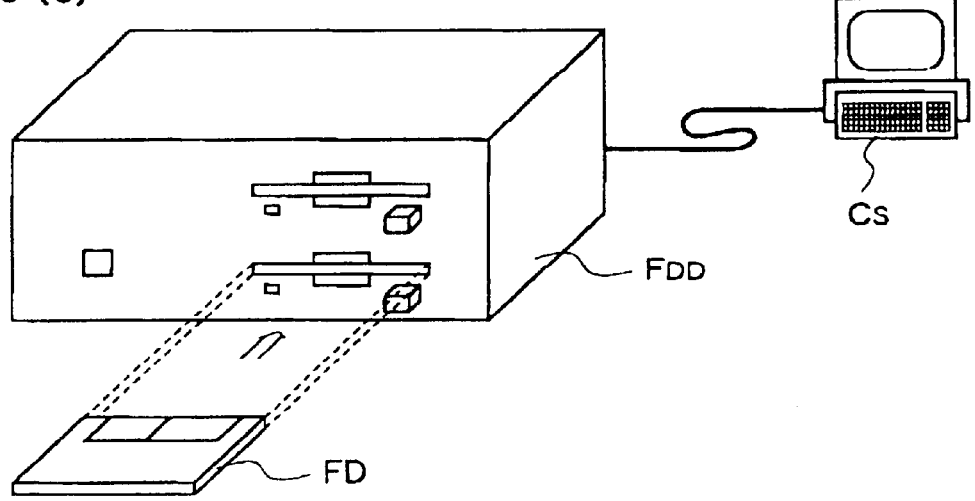
Figure 11:
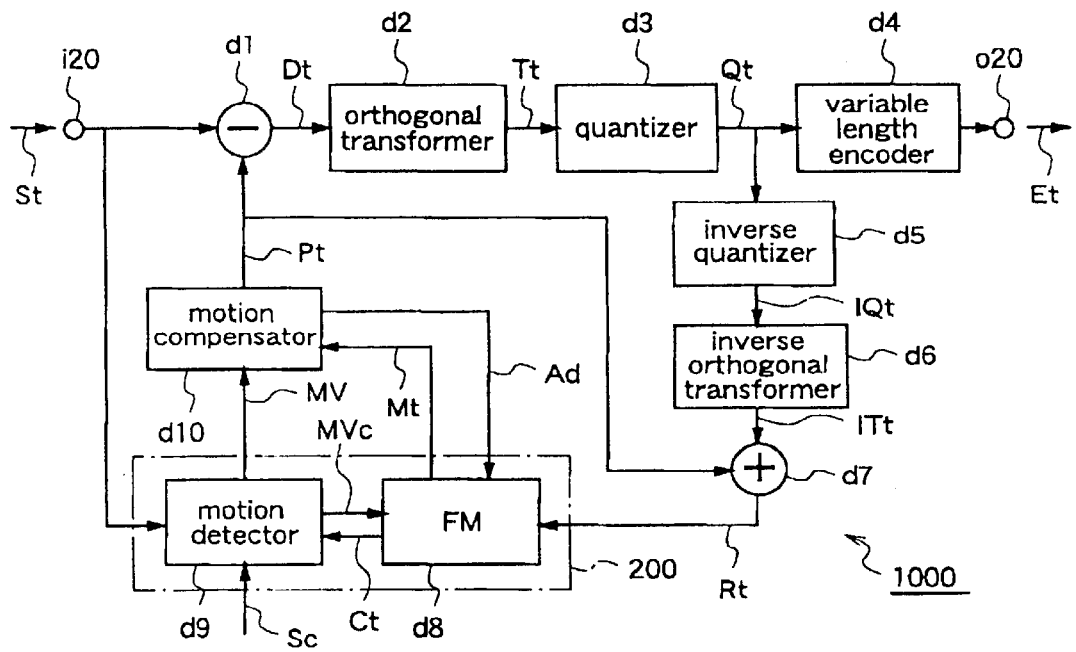
FIG. 11 is a block diagram for explaining a prior art typical inter-frame motion compensation coding apparatus.
Figure 12:
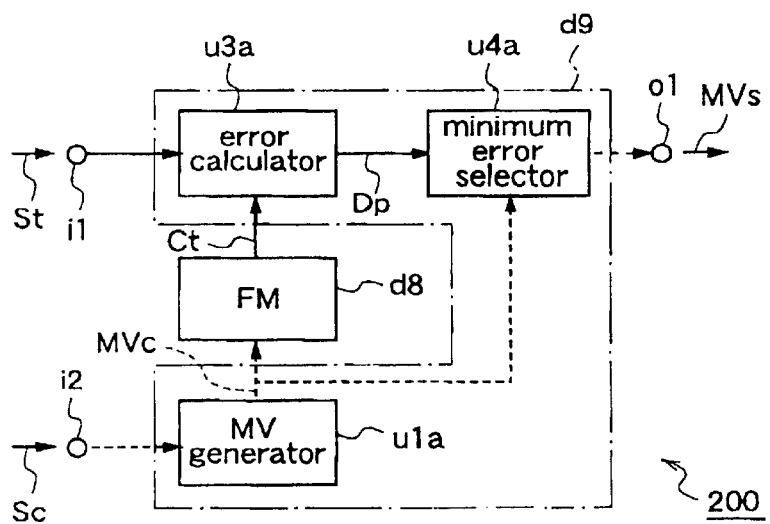
FIG. 12 is a block diagram for explaining a typical motion detection apparatus as a constituent of the prior art interframe motion compensation coding apparatus.

FIGS. 10(a)–10(c) are diagrams for explaining the case where the motion vector detection process in the motion vector detection apparatus according to any of the first to fourth embodiments is executed by a computer system using a floppy disk which contains the motion detection program.

FIG. 10(a) shows a front view of a floppy disk FD, a cross-sectional view thereof, and a floppy disk body D. FIG. 10(b) shows an example of a physical format of the floppy disk body D.

The floppy disk FD is composed of the floppy disk body D and a case FC which contains the floppy disk body D. On the surface of the disk body D, a plurality of tracks Tr are formed concentrically from the outer circumference of the disk toward the inner circumference. Each track is divided into 16 sectors (Se) in the angular direction. Therefore, in the floppy disk FD containing the above-mentioned program, data of the program are recorded in the assigned sectors on the floppy disk body D.

FIG. 10(c) shows the structure for recording the program in the floppy disk FD and performing the image processing with software by using the program stored in the floppy disk FD.

To be specific, when the program is recorded in the floppy disk FD, data of the program are written in the floppy disk FD from the computer system Cs through the floppy disk drive FDD. When the above-mentioned motion vector detection apparatus is constructed in the computer system Cs by the program recorded in the floppy disk FD, the program is read from the floppy disk FD by the floppy disk drive FDD and then loaded to the computer system Cs.

Although in the above description a floppy disk is employed as a data storage medium, an optical disk may be employed. Also in this case, the motion vector detection can be performed by software in like manner as the case of using the floppy disk. The data storage medium is not restricted to these disks, and any medium may be employed as long as it can contain the program, for example, an IC card or a ROM cassette.

What is claimed is:

1. A motion vector detection method including a motion vector detection process of searching a position of a prediction block, corresponding to a block to be processed as a processing target, on a reference frame under a prescribed condition, for each block comprising a predetermined number of pixels as a unit for processing image data of a frame to be processed, thereby to detect information indicating the position of the prediction block as a motion vector corresponding to the block to be processed, comprising:

a calculation process of calculating an error of image data between a block corresponding to a motion vector search origin as a position where search of the position of the prediction block is started, and the block to be processed as the processing target, as a motion compensation error corresponding to the motion vector search origin; and a comparison process of comparing a motion compensation error corresponding to a neighboring block in the vicinity of the block to be processed, which is an error of image data between the neighboring block and a prediction block corresponding thereto, with the motion compensation error corresponding to the motion vector search origin, and switching between outputting positional information indicating the motion vector search origin as the motion vector corresponding to the block to be processed, according to a comparison result between both of the motion compensation errors, as the motion vector corresponding to the block to be processed, and outputting a motion vector which is obtained by performing the motion vector detection process with the motion vector search origin as a search starting position, as the motion vector corresponding to the block to be processed.

2. The motion vector detection method of claim 1 comprising:

when the motion compensation error corresponding to the motion vector search origin is smaller than the motion compensation error corresponding to the neighboring block, outputting the positional information indicating the motion vector search origin as it is as the motion vector corresponding to the block to be processed.

3. The motion vector detection method of claim 1 comprising:

when the motion compensation error corresponding to the motion vector search origin is smaller than the motion compensation error corresponding to the neighboring block and the motion compensation error corresponding to the motion vector search origin is smaller than a predetermined value, outputting the positional information indicating the motion vector search origin as it is, as the motion vector corresponding to the block to be processed.

4. The motion vector detection method of claim 3 comprising:

when a motion detection instruction signal is input from outside, outputting a motion vector which is obtained by performing the motion vector detection process with the motion vector search origin as the search starting position, as the motion vector corresponding to the block to be processed, regardless of size relationship between the motion compensation error corresponding to the neighboring block and the motion compensation error corresponding to the motion vector search origin.

5. The motion vector detection method of claim 1 comprising:

when a magnitude of a difference between the motion compensation error corresponding to the neighboring block and the motion compensation error corresponding to the motion vector search origin is smaller than a predetermined value, outputting the positional information indicating the motion vector search origin as it is, as the motion vector corresponding to the block to be processed.

6. A motion vector detection method of searching a position of a prediction block, corresponding to a block to be processed as a processing target, on a reference frame under a prescribed condition, for each block comprising a predetermined number of pixels as a unit for processing image data of a frame to be processed, thereby to detect information indicating the position of the prediction block as a motion vector corresponding to the block to be processed, comprising:

a process of searching the position of the prediction block in a first search range which is set on the reference frame, and calculating a first motion compensation error as an error of image data between a block on the reference frame, which block is specified by a first candidate motion vector corresponding to the block to be processed, and the block to be processed on the processed frame;

a process of searching the position of the prediction block in a second search range on the reference frame in the vicinity of a pixel position indicated by the first candidate motion vector, and calculating a second motion compensation error as an error of image data between a block on the reference frame, which block is specified by a second candidate motion vector corresponding to the block to be processed, and the block to be processed on the processed frame;

a process of searching the position of the prediction block in a third search range on the reference frame, which range is set on the basis of the first candidate motion vector and second candidate motion vector, and calculating a third motion compensation error as an error of image data between a block on the reference frame, which block is specified by a third candidate motion vector corresponding to the block to be processed, and the block to be processed on the processed frame; and a process of comparing the first, second, and third motion compensation errors, and selecting one of the first, second, and third candidate motion vectors as the motion vector corresponding to the block to be processed, according to a result of the comparison.

7. The motion vector detection method of claim 6 wherein the third search range is set in a region other than the first and second search ranges on the reference frame; and the position of the prediction block is searched in the third search range without referring to the first and second motion compensation errors.

8. The motion vector detection method of claim 6 wherein in the first search range, the position of the prediction block is searched in pixel units; and in the third search range, the position of the prediction block is searched by interpolating a pixel value corresponding to a virtual pixel between pixels of the reference frame and with precision higher than ½-pixel precision.

9. The motion vector detection method of claim 6 wherein in the second search range, the position of the prediction block is searched only in a vertical or horizontal direction on the reference frame, and in the third search range, the position of the prediction block is searched in a direction other than the direction of the second search range.

10. A motion vector detection apparatus which performs a motion vector detection process of searching a position of a prediction block, corresponding to a block to be processed as a processing target, on a reference frame under a prescribed condition, for each block comprising a predetermined number of pixels as a unit for processing image data of a frame to be processed, thereby to detect information indicating the position of the prediction block, as a motion vector corresponding to the block to be processed, comprising:

an error calculation unit for calculating an error of image data between a block corresponding to a motion vector search origin as a position where search of the position of the prediction block is started, and the block to be processed as the processing target, as a motion compensation error corresponding to the motion vector search origin;

a comparison unit for comparing a motion compensation error corresponding a neighboring block in the vicinity of the block to be processed, which is an error of image data between the neighboring block and a prediction block corresponding thereto, with the motion compensation error corresponding to the motion vector search origin;

a decision unit for deciding whether the motion vector detection process for the block to be processed is to be performed, according to a result of the comparison of the motion compensation errors;

a motion detection unit for detecting a motion vector by performing the motion vector detection process with the motion vector search origin as a search starting position, only when the decision unit decides that the motion vector detection process is to be performed;

a selection unit for outputting the motion vector detected by the motion detection unit as the motion vector corresponding to the block to be processed when the decision unit decides that the motion vector detection process is to be performed, and outputting positional information indicating the motion vector search origin as it is as the motion vector corresponding to the block to be processed, when the decision unit decides that the motion vector detection process is not to be performed; and a memory for temporarily containing the motion compensation error corresponding to the motion vector output from the selection unit, as data for deciding whether the motion vector detection process for other blocks is to be performed.

11. A motion vector detection apparatus for searching a position of a prediction block, corresponding to a block to be processed as a processing target, on a reference frame under a prescribed condition, for each block comprising a predetermined number of pixels as a unit for processing image data of a frame to be processed, thereby to detect information indicating the position of the prediction block as a motion vector corresponding to the block to be processed, comprising:

a first motion detection unit for searching the position of the prediction block in a first search range which is set on the reference frame, and calculating a first motion compensation error as an error of image data between a block on the reference frame, which block is specified by a first candidate motion vector corresponding to the block to be processed, and the block to be processed on the processed frame;

a second motion detection unit for searching the position of the prediction block in a second search range on the reference frame, which is in the vicinity of a pixel position indicated by the first candidate motion vector, and calculating a second motion compensation error as an error of image data between a block on the reference frame, which block is specified by a second candidate motion vector corresponding to the block to be processed, and the block to be processed;

a third motion detection unit for searching the position of the prediction block in a third search range on the reference frame, which is set on the basis of the first candidate motion vector and second candidate motion vector, and calculating a third motion compensation error as an error of image data between a block on the reference frame, which block is specified by a third candidate motion vector corresponding to the block to be processed, and the block to be processed; and a selection unit for comparing the first, second, third motion compensation errors, and selecting one of the first, second, third candidate motion vectors as the motion vector corresponding to the block to be processed, according to a result of the comparison.

12. A data storage medium containing a program wherein the program makes a computer perform a process of detecting a motion vector corresponding to a block to be processed, according to the motion vector detection method of claim 1.

13. A data storage medium containing a program wherein the program makes a computer perform a process of detecting a motion vector corresponding to a block to be processed, according to the motion vector detection method of claim 6.

* * * * *